United States Patent
Yada

(10) Patent No.: US 6,320,981 B1
(45) Date of Patent: Nov. 20, 2001

(54) IMAGE PROCESSING SYSTEM AND IMAGE PROCESSING METHOD

(75) Inventor: Shinichi Yada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/135,574

(22) Filed: Aug. 18, 1998

(30) Foreign Application Priority Data

Aug. 28, 1997 (JP) .................................................. 9-233005

(51) Int. Cl.[7] ....................................................... G06K 9/00
(52) U.S. Cl. ........................... 382/168; 382/270; 358/466
(58) Field of Search .................................... 382/168, 169, 382/170, 171, 172, 270, 273; 358/465, 466, 443, 448

(56) References Cited

U.S. PATENT DOCUMENTS

| 5,046,119 | | 9/1991 | Hoffert et al. | |
|---|---|---|---|---|
| 5,067,163 | * | 11/1991 | Adachi | 382/270 |
| 5,249,241 | * | 9/1993 | Silverman et al. | 382/169 |
| 5,727,080 | * | 3/1998 | Cox et al. | 382/168 |
| 5,734,740 | * | 3/1998 | Benn et al. | 382/168 |
| 6,118,892 | * | 9/2000 | Williams | 382/168 |
| 6,148,103 | * | 11/2000 | Nenonen | 382/169 |

FOREIGN PATENT DOCUMENTS

A-1-188166   7/1989  (JP) .

* cited by examiner

Primary Examiner—Thomas D. Lee
(74) Attorney, Agent, or Firm—Oliff & Berridge, PLC

(57) ABSTRACT

Block representative values are set adaptively based on the feature amount concerning the distribution state of a prepared histogram of input image data. Thus, if block truncation coding is executed based on an input image having mixed CG image and scanned image areas, efficient coding can be performed and a high-quality decomposed image can be provided. Further, when the histogram is divided into image data groups, the image data groups can be again divided to provide a high-quality decomposed image, thus efficient coding can be performed and a high-quality decomposed image can be provided more reliably.

28 Claims, 18 Drawing Sheets

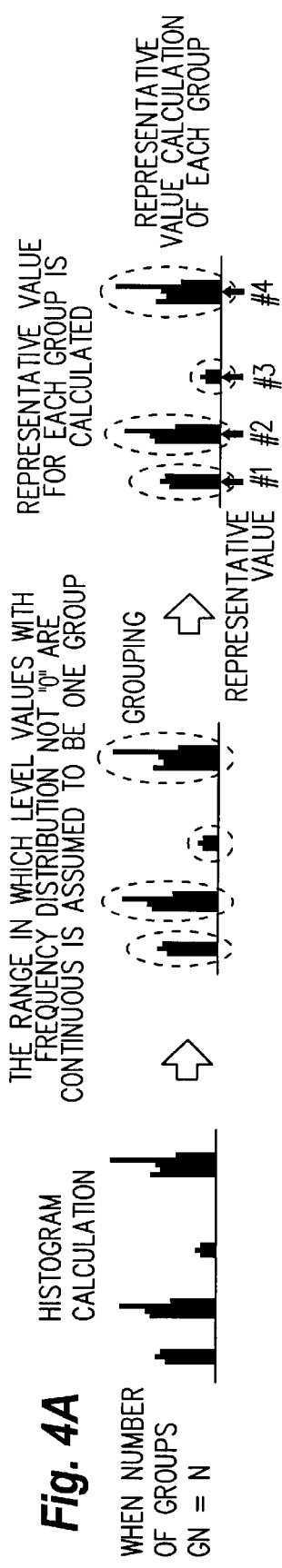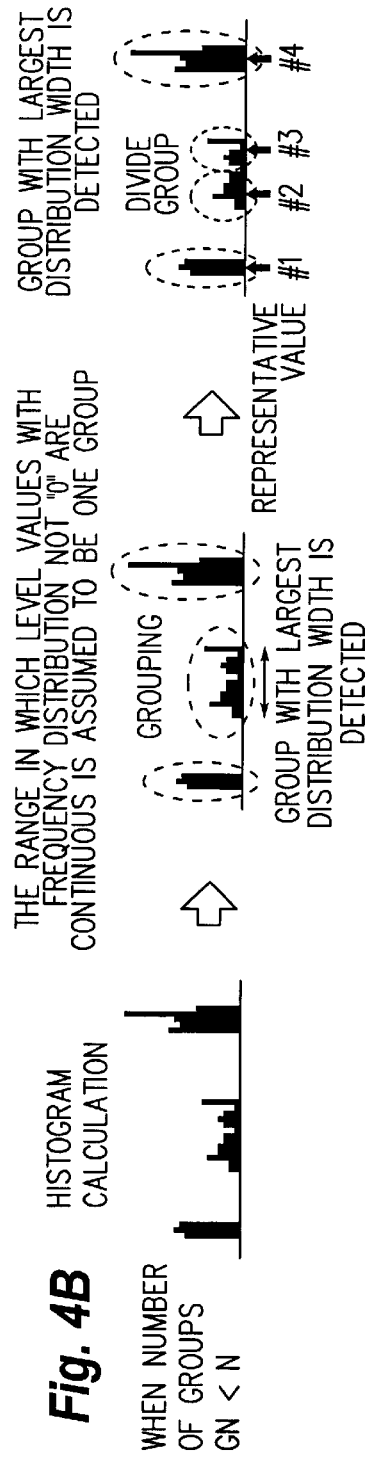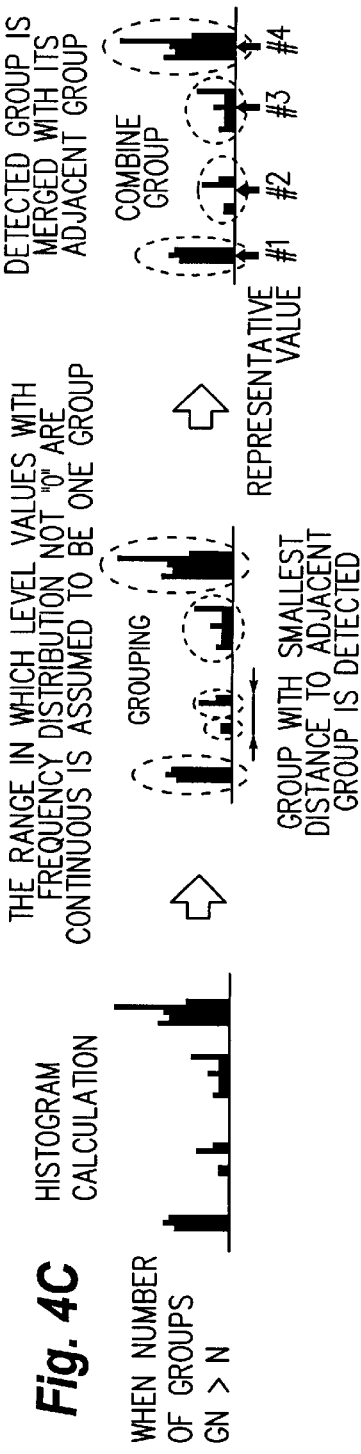
Fig. 4A  WHEN NUMBER OF GROUPS GN = N
Fig. 4B  WHEN NUMBER OF GROUPS GN < N
Fig. 4C  WHEN NUMBER OF GROUPS GN > N

| Fig. 12A |
| Fig. 12B |

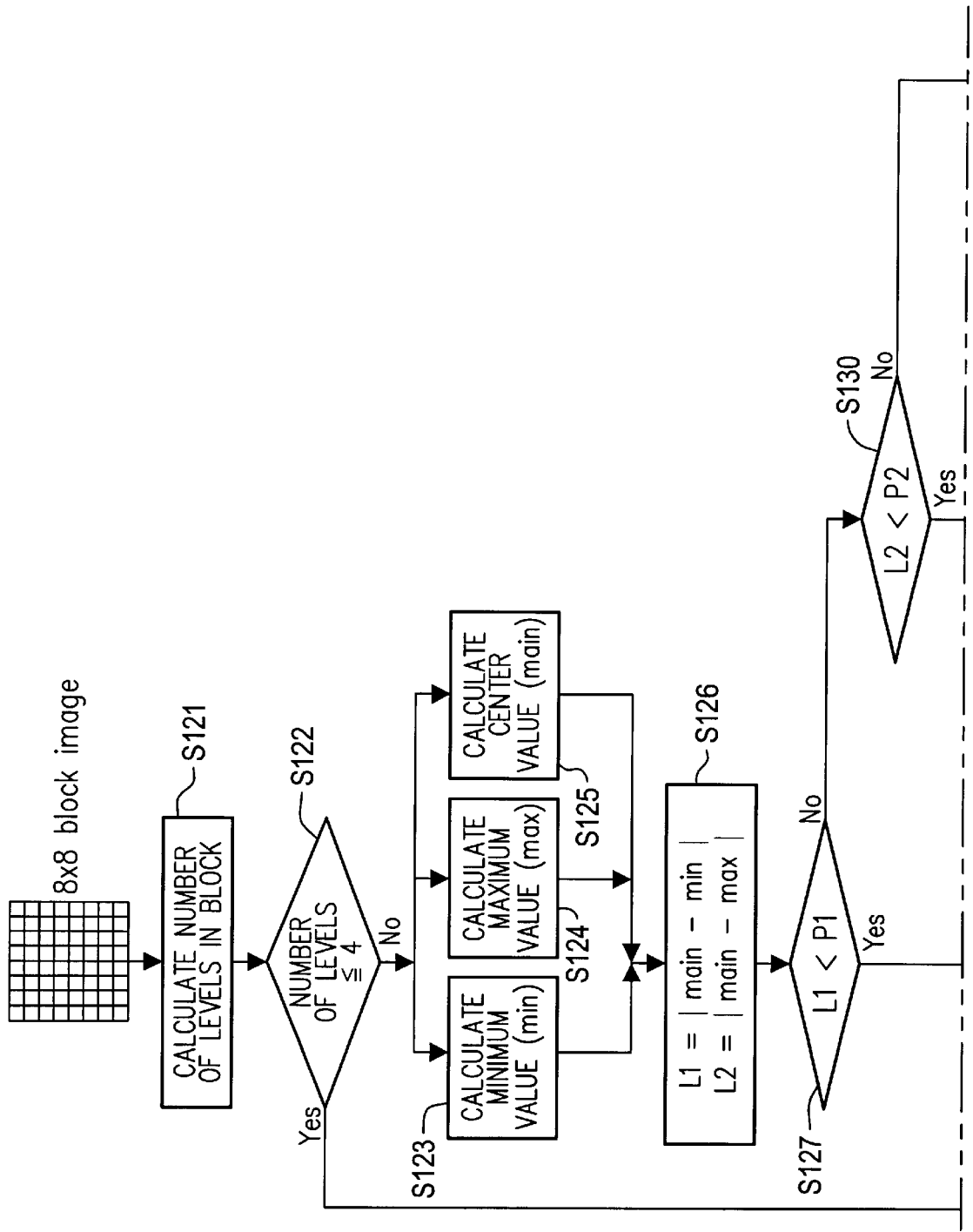

IMAGE PROCESSING SYSTEM AND IMAGE PROCESSING METHOD

BACKGROUND OF THE INVENTION

This invention relates to an image processing system and an image processing method and in particular to an image processing system and its control method for coding and decoding image data efficiently.

In recent years, a digital copier for reading an original image through an image input unit such as a scanner, digitally processing obtained image data, and outputting the result through an image output unit such as a printer, thereby making a hard copy of the original has become pervasive.

The digital copier has an electronic sorter function of storing image data corresponding to a number of images in the copier and sorting originals and an electronic RDH function of filing, page editing, etc., as indispensable functions.

Thus, the digital copier contains memory for temporarily storing image data and a data storage unit such as a large-capacity storage unit typified by a hard disk drive and provides the above-mentioned functions by storing image data and performing processing as required.

To store a large amount of image data, the storage capacity of a data storage unit needs to be increased, but the data storage unit also increases in scale and cost with an increase in the data capacity.

To avoid this problem, a large number of methods for compressing image data and storing the compressed data in a data storage unit are proposed.

Resultantly, a data storage unit having a small capacity can store a large amount of image data.

A laser beam printer using a laser beam is known as an image output unit.

Generally, a page description language is used for a control method of image output to the laser beam printer.

More particularly, a host computer transfers the page description language contents describing text information and image information of the output contents to the laser beam printer instead of transferring the output contents to the printer as a bit map image (raster image). When receiving the page description language, the printer interprets the language contents, expands page image data as a bit map image (raster image), and transfers and outputs the image onto paper.

The printer must contain a function of interpreting the page description language contents and memory for retaining bit map image for expanding image data.

For example, with a monochrome printer using A3-size paper for output, the memory capacity becomes 32 Mbytes when the image output resolution is 400 dpi and output gradation is 256 levels of gray.

Further, since a color printer needs to output four colors of Y, M, C, and K, the memory capacity also becomes four times that of the monochrome printer; when the image output resolution is 400 dpi and output gradation is 256 levels of gray, the memory capacity becomes 128 Mbytes.

Installation of such large-capacity memory in the printer leads to an increase in the scale and cost of the printer; it is not preferred.

Then, to avoid the problem, a method of compressing image data for decreasing the necessary memory capacity is proposed.

To compress image data for decreasing the data capacity, if the number of gradation steps for reproducing an image is decreased, the finally provided image output quality is degraded. The effect is large particularly if an image is stored in a binarized state.

Thus, to provide high-quality image output, it is desirable to store an image in a multiple-valued state.

A large number of methods of compressing multiple-valued image data are available.

A text area and a photo area often are mixed even in a 1-sheet original among originals output to a digital copier or a printer.

A computer-prepared image, so-called computer graphics (CG) image, and a scanned image of a photo, etc., read through a scanner often are mixed in a printer output image.

The CG and scanned images have entirely different image characteristics.

For example, a CG image area in which a CG image is drawn is constant in pixel value change and contains a flat background area with no pixel image change as a large part.

However, the CG image area also contains a text area containing only binary values of monochrome, a gradation area in which pixel values change violently, and the like.

In contrast, a scanned image area in which a scanned image is drawn often contains noise when the image is read through the scanner; pixel values often change finely even in an area which seems to be flat, such as an image background or blank.

Since the CG image and scanned image areas have different image characteristics, proper compression processing to the image characteristics in each of the CG image and scanned image areas needs to be performed to suppress image quality degradation and effectively compress the image data corresponding to an image having mixed CG image and scanned image areas.

To meet such demand, it is necessary to select optimum image processing for each area of the image data corresponding to an image having mixed areas having different image characteristics in response to the image characteristic and perform compression processing accordingly.

A large number of compression techniques for performing optimum image processing for each area are proposed as adaptive image compression technique or multi-mode compression technique.

Since the CG image area often contains an image requiring a high resolution, such as a text or a line drawing, a compression technique suppressing resolution data degradation is desired for the CG image area.

For example, a reversible compression technique of MMR (Modified Read), LZW (Lempel-Ziv-Welch), JBIG (Joint Bi-level Image Group), etc., or a block compression technique of block truncation coding, etc., wherein resolution data is not degraded although gradation data is degraded is appropriate for the CG image area.

Block run length coding of dividing an image into blocks each consisting of n×m pixels and combining the representative value of the block and the number of the continuous blocks having the value is appropriate for a background area with little pixel value change in the CG image area.

Since the scanned image area often contains an image requiring the number of gradation steps rather than resolution, such as a photo or a natural image, a compression technique suppressing gradation data degradation is desired for the scanned image area.

By the way, if the reversible compression technique suppressing image degradation after decompression is applied to the scanned image area, pixel values change violently and entropy is high in the scanned image area, thus the compression efficiency cannot be enhanced in the reversible compression technique.

Then, an irreversible technique capable of retaining gradation data corresponding to the number of gradation steps after decompression is desired for the scanned image area.

For example, ADCT (Adaptive Discrete Cosine Transform), etc., typified by JPEG (Joint Photographic Experts Group) baseline technique adopted as a color fax standardization technique is appropriate for the scanned image area.

The block truncation coding will be discussed.

The block truncation coding is one type of block coding for dividing an image into blocks each consisting of m×n (m and n are natural numbers except m=n=1) pixels, calculating one or more values representing a block for each block, which will be hereinafter referred to as block representative value or values, and to calculate more than one block representative value, determining index numbers indicating which block representative value is assigned to each pixel in the block.

The block truncation coding is a coding technique using block representative values and the index number assigned to each pixel as code data and the provided code data amount and decoded image quality are determined according to the number of block representative values.

A: When the Number of Block Representative Values is One

When the number of block representative values is one, for example, the mean value, etc., in the block is used as the block representative value and is assigned to all pixels in the block.

Resultantly, in the decoded image, the entire block becomes the one color corresponding to the block representative value assigned.

B: When the Number of Block Representative Values is Two

When the number of block representative values is two, for example, the maximum and minimum values of the pixel data of the pixels making up the block are used as the block representative values. Which of the two block representative values each pixel in the block is more closely analogous to is determined, and the index number corresponding to the block representative value more closely analogous to each pixel is assigned thereto.

More specifically, the index numbers assigned to the pixels representing the two block representative values can be represented in one bit and thus assuming that an image is divided into blocks each consisting of 4×4 pixels and that each of the two block representative values is represented in eight bits equal to the number of gradation data bits of the original image, the code amount required for representing each block, M, is $$M = \{(\text{number of bits of block representative value}) \times 2\} +$$
$$\{(\text{number of bits of index number}) \times$$
$$(\text{number of pixels of block})\}$$
$$= (8 \times 2) + (1 \times 4 \times 4)$$
$$= 16 + 16$$
$$= 32 \text{ [bits]}$$

The original image data amount M' is $$M' = (\text{number of gradation data bits}) \times$$
$$(\text{number of pixels of block})$$
$$= 8 \times 4 \times 4$$
$$= 16 + 16$$
$$= 128 \text{ [bits]}$$

Thus, the compression rate $(= M/M')$ is $$M/M' = 32/128$$
$$= 1/4$$

C: When the Number of Block Representative Values is Four

When the number of block representative values is four, generally the block representative values are calculated based on the maximum value, the minimum value, the dynamic range, the mean value, etc., of the pixel data of the pixels making up the block. Which of the four block representative values each pixel in the block is more closely analogous to is determined, and the index number corresponding to the block representative value more closely analogous to each pixel is assigned thereto.

More specifically, the index numbers assigned to the pixels representing the four block representative values can be represented in two bits and thus assuming that an image is divided into blocks each consisting of 4×4 pixels and that each of the four block representative values is represented in eight bits equal to the number of gradation data bits of the original image, the code amount required for representing each block, M, is $$M = \{(\text{number of bits of block representative value}) \times 4\} +$$
$$\{(\text{number of bits of index number}) \times$$
$$(\text{number of pixels of block})\}$$
$$= (8 \times 4) + (2 \times 4 \times 4)$$
$$= 32 + 32$$
$$= 64 \text{ [bits]}$$

The original image data amount M' is $$M' = (\text{number of gradation data bits}) \times$$
$$(\text{number of pixels of block})$$
$$= 8 \times 4 \times 4$$
$$= 128 \text{ [bits]}$$

Thus, the compression rate $(= M/M')$ is $$M/M' = 64/128$$
$$= 1/2$$

In the block truncation coding, the block size (=m×n) can be set to any size.

However, in the block truncation coding, the pixel values contained in the block are approximated by a limited number of block representative values, thus if the block size is large and the number of block representative values is small, the difference between the decoded image and the original image grows.

If the number of block representative values is increased to avoid this problem, the number of bits of data indicating the index number representing the block representative value assigned to each pixel increases and the compression efficiency lowers.

Therefore, generally the block truncation coding is executed in a block size of about 4×4 pixels.

The multi-mode compression technique using the block truncation coding and ADCT coding in combination will be discussed.

The multi-mode compression technique using the block truncation coding and ADCT coding in combination requires that the block truncation coding and ADCT coding be changed in block units.

In the two coding techniques, coding processing is performed in block units; to change the coding technique in block units, the block size needs to be made common to the two coding techniques.

The block size in the ADCT coding generally is 8×8 pixels. In the ADCT coding, a block size smaller than the block size of 8×8 pixels can be adopted theoretically, but the number of DCT coefficients generated at the DCT (Discrete Cosine Transform) operation time decreases extremely, thus effective coding cannot be executed and a block size smaller than that of 8×8 pixels is not practical.

Therefore, preferably the block size in the multi-mode compression technique is also set to 8×8 pixels and the block size in the block truncation coding is also set to 8×8 pixels inevitably.

To code image data of an image having mixed CG image and scanned image areas according to the multi-mode compression technique, the blocks where image data is to be coded can be classified into the following three types according to the type of image contained therein:

(1) Block containing only a CG image area;
(2) Block containing only a scanned image area; and
(3) Block containing both CG image and scanned image areas It is desirable to code the block containing only a CG image area by executing the block truncation coding and the block containing only a scanned image area by executing the ADCT coding as described above.

By the way, if the block containing both CG image and scanned image areas is coded by executing the ADCT coding, it is feared that mosquito noise, which is noise proper to the ADCT coding, may become obtrusive in the CG image area in the proximity of the boundary between the CG image and scanned image areas, degrading the decomposed image quality. Therefore, it is desirable to code the block containing both CG image and scanned image areas by executing the block truncation coding; the block size becomes 8×8 pixels as described above.

To execute the block truncation coding in a block of 8×8 pixels, at least four block representative values need to be set. Therefore, generally the block representative values are calculated based on the maximum value, the minimum value, the dynamic range, the mean value, etc., of the pixel data of the pixels making up the block, as described above.

However, the block representative value determining method as linear operation assumes image data having a histogram distribution in which the pixel values of the pixels making up the image data to be coded are comparatively smooth and continuous, for example, as in a scanned image area.

Therefore, if a discrete distribution and a smooth and continuous distribution are mixed as a pixel value distribution as in the block containing both CG image and scanned image areas, the block representative value determining method as linear operation is difficult to determine effective block representative values.

More specifically, the CG image area often contains constant pixel values continuous in a small area.

Thus, when a small area in which the same pixel values are continuous is divided into blocks and the block truncation coding is executed in the blocks, if the blocks differ in block representative values, a decomposed image becomes very unnatural, degrading the image quality.

However, since the block representative values are determined as linear operation in the conventional block truncation coding, the above-described problem occurs in the CG image area and a high-quality decomposed image cannot be provided.

SUMMARY OF THE INVENTION

It is therefore an object of the invention to provide an image processing system and an image processing method capable of providing a high-quality decomposed image even if a multi-mode compression technique is used to execute image compression in an image having mixed CG image and scanned image areas.

To the end, according to the invention of aspect 1, there is provided an image processing system for assigning any one of block representative values to approximate image data to the image data corresponding to each of pixels making up an input image and then coding the image data in units of block images made up of the pixels, the image processing system comprising frequency distribution detection means for detecting a frequency distribution of image data input for each of the block images, feature amount calculation means for calculating a feature amount concerning a distribution state of an area in the proximity of a distribution range end in the detected frequency distribution, determination means for determining whether or not the block representative values are to be set from the frequency distribution of the area in the proximity of the distribution range end based on the calculated feature amount, and representative value setting means for setting the block representative values based on the detected frequency distribution in response to the determination result of the determination means.

According to the invention of aspect 4, there is provided an image processing system for assigning any one of block representative values to approximate image data to the image data corresponding to each of pixels making up an input image and then coding the image data in units of block images made up of the pixels, the image processing system comprising histogram preparation means for preparing a histogram of image data input for each of the block images, image data dividing means for dividing the image data into image data groups based on the prepared histogram, feature amount calculation means for calculating a feature amount concerning a distribution state of the histogram corresponding to each of the image data groups, determination means for determining whether or not the block representative value is to be calculated using the histogram corresponding to each of the image data groups provided by the image data dividing means based on the calculated feature amount, redividing control means for causing the image data dividing means to again divide the image data if the block representative value is not calculated using the histogram corresponding to each of the image data groups provided by the image data dividing means in response to the determination result of the determination means, and block representative value calculation means for calculating the block representative value in response to the determination result of the determination means.

According to the invention of aspect 7, there is provided an image processing system for assigning any one of block representative values to approximate image data to the image data corresponding to each of pixels making up an input image and then coding the image data in units of block images made up of the pixels, the image processing system comprising histogram preparation means for preparing a histogram of image data input for each of the block images based on a predetermined condition, image data dividing means for dividing the image data into image data groups based on the prepared histogram, feature amount calculation means for calculating a feature amount concerning a distribution state of the histogram corresponding to each of the image data groups, threshold value calculation means for calculating a threshold value for again dividing the image data groups provided by the image data dividing means based on the calculated feature amount, redividing control means for causing the provided image data groups to be again divided based on the threshold value, and block representative value setting means for setting the block representative value based on the histogram corresponding to each of the image data groups after again divided.

According to the invention of aspect 9, there is provided an image processing system for assigning any one of block representative values to approximate image data to the image data corresponding to each of pixels making up an input image and then coding the image data in units of block images made up of the pixels, the image processing system comprising histogram preparation means for preparing a histogram of image data input for each of the block images based on a predetermined condition, feature amount calculation means for calculating a feature amount concerning a distribution state of the histogram corresponding to each of the image data groups, image data dividing means for dividing the image data into M image data groups (where M is an integer of two or more) based on the prepared histogram, comparison means for comparing the number of image data groups M with the preset number of block representative values N (where N is a natural number), first representative value setting means for setting M block representative values if the number of image data groups M is equal to or less than the number of block representative values N based on the comparison result of the comparison means, and second representative value setting means for setting N block representative values if the number of image data groups M exceeds the number of block representative values N based on the comparison result of the comparison means.

According to the invention of aspect 10, there is provided an image processing system for assigning any one of block representative values to approximate image data to the image data corresponding to each of pixels making up an input image and then coding the image data in units of block images made up of the pixels, the image processing system comprising histogram preparation means for preparing a histogram of image data input for each of the block images based on a predetermined condition, image data dividing means for dividing the image data into image data groups based on the prepared histogram, redividing control means for causing the image data dividing means to again divide the image data if the number of image data groups differs from the number of block representative values preset, feature amount calculation means for calculating a feature amount concerning a distribution state of the histogram corresponding to each of the image data groups, determination means for determining whether or not the block representative value is to be calculated using the histogram corresponding to the image data groups based on the calculated feature amount, and block representative value calculation means for calculating the block representative value in response to the determination result of the determination means.

According to the invention of aspect 16, there is provided an image processing method for assigning any one of block representative values to approximate image data to the image data corresponding to each of pixels making up an input image and then coding the image data in units of block images made up of the pixels, the image processing method comprising a histogram preparation step of preparing a histogram of image data input for each of the block images based on a predetermined condition, a feature amount calculation step of calculating a feature amount concerning a distribution state of the histogram corresponding to each of the image data groups, an image data dividing step of dividing the image data into M image data groups (where M is an integer of two or more) based on the prepared histogram, a comparison step of comparing the number of image data groups M with the preset number of block representative values N (where N is a natural number), a first representative value setting step of setting M block representative values if the number of image data groups M is equal to or less than the number of block representative values N based on the comparison result in the comparison step, and a second representative value setting step of setting N block representative values if the number of image data groups M exceeds the number of block representative values N based on the comparison result in the comparison step.

According to the invention of aspect 17, there is provided an image processing method for assigning any one of block representative values to approximate image data to the image data corresponding to each of pixels making up an input image and then coding the image data in units of block images made up of the pixels, the image processing method comprising a histogram preparation step of preparing a histogram of image data input for each of the block images, an image data dividing step of dividing the image data into image data groups based on the prepared histogram, a feature amount calculation step of calculating a feature amount concerning a distribution state of the histogram corresponding to each of the image data groups, a determination step of determining whether or not the block representative value is to be calculated using the histogram corresponding to each of the image data groups provided in the image data dividing step based on the calculated feature amount, a redividing control step of causing the image data dividing step to again divide the image data if the block representative value is not calculated using the histogram corresponding to each of the image data groups provided in the image data dividing step in response to the determination result in the determination step, and a block representative value calculation step of calculating the block representative value in response to the determination result in the determination step.

According to the invention of aspect 18, there is provided an image processing method for assigning any one of block representative values to approximate image data to the image data corresponding to each of pixels making up an input image and then coding the image data in units of block images made up of the pixels, the image processing method comprising a histogram preparation step of preparing a histogram of image data input for each of the block images based on a predetermined condition, an image data dividing step of dividing the image data into image data groups based on the prepared histogram, a redividing control step of causing the image data dividing step to again divide the image data if the number of image data groups differs from the number of block representative values preset, a feature amount calculation step of calculating a feature amount concerning a distribution state of the histogram corresponding to each of the image data groups, a determination step of determining whether or not the block representative value is to be calculated using the histogram corresponding to the image data groups based on the calculated feature amount, and a block representative value calculation step of calculating the block representative value in response to the determination result in the determination step.

BRIEF DESCRIPTION OF THE DRAWINGS

In the accompanying drawings:

FIGS. 4A to 4C are schematic conceptual representation of calculation of the number of groups;

DETAILED DESCRIPTION OF THE PREFERRED EMBODIMENTS

Referring now to the accompanying drawings, there are shown preferred embodiments of the invention.

In the description to follow, a monochrome image of eight bits/pixel as the number of gradation steps of an input image is taken as an example, but the invention can also be applied to an RGB image of 24 bits/pixel as the number of gradation steps of an input image, a YMCK image of 32 bits/pixel as the number of gradation steps of an input image, etc.

<First Embodiment>

Figure 1:
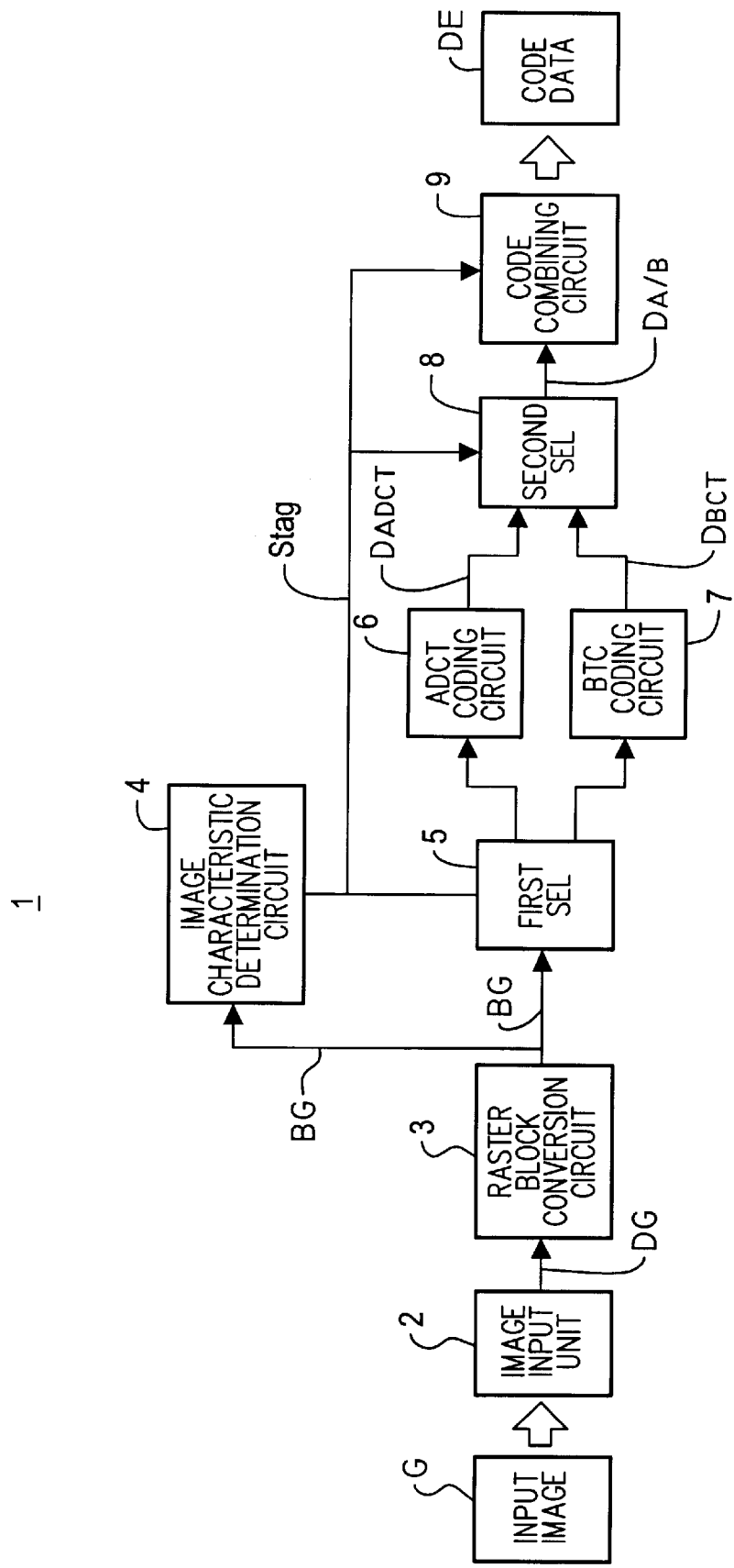
FIG. 1 is a block diagram of a schematic configuration of a coding circuit.

FIG. 1 is a block diagram to show a schematic configuration of a coding circuit of an image processing system of a first embodiment of the invention.

A coding circuit 1 of an image processing system comprises an image input unit 2 for generating image data DG based on input image G and outputting the image data DG, a raster block conversion circuit 3 for dividing the input image data DG into block images BG each consisting of 8×8 pixels, an image characteristic determination circuit 4 for referencing pixel value change in each block image BG, determining which of ADCT coding and block truncation coding is applied to the input block image BG, and outputting a tag signal STAG based on the determination result, a first selector 5 for outputting the input block image BG to either an ADCT coding circuit 6 or a block truncation coding circuit 7 (described later) based on the tag signal STAG, an ADCT coding circuit 6 for performing ADCT coding processing for the input block image BG and outputting ADCT-coded data DADCT, a block truncation coding circuit 7 for performing block truncation coding processing for the input block image BG and outputting block-truncation-coded data DBCT, a second selector 8 for outputting either the ADCT-coded data DADCT or the block-truncation-coded data DBCT as coded data DA/B based on the tag signal STAG, and a code combining circuit 9 for combining the coded data DA/B and the tag signal STAG and outputting code data DE.

The operation of the described coding circuit is as follows:

The image input unit 2, which functions as an interface for receiving a raster image, receives image data DG corresponding to input image G directly as a raster image of digital data from an external network, etc., like an external interface or raster data output by a decomposer of a postscript printer and outputs the data to the raster block conversion circuit 3 as image data DG.

The raster block conversion circuit 3 divides the input image data DG into block images BG each consisting of 8×8 pixels and outputs the block images BG to the image characteristic determination circuit 4 and the first selector 5.

The image characteristic determination circuit 4 references pixel value change in each block image BG, analyzes the image characteristic of the input block image BG to determine which of ADCT coding and block truncation coding is applied to the block image BG, and outputs a tag signal STAG to the first selector 5, the second selector 8, and the code combining circuit 9 based on the determination result.

More specifically, the image characteristic determination circuit 4 calculates the characteristic values of the maximum number of gradation steps, the dynamic range, the complexity, etc., of the block image BG and considers the correlation among the characteristic values to determine that the image contained in the block image BG contains only a scanned image area, only a CG image area, or both scanned image and CG image areas.

If the image contained in the block image BG contains only a scanned image area as a result of the determination, the image characteristic determination circuit 4 selects ADCT coding application and outputs the corresponding tag signal STAG to the first selector 5, the second selector 8, and the code combining circuit 9.

If the image contained in the block image BG contains only a CG image area or both scanned image and CG image areas, the image characteristic determination circuit 4 selects block truncation coding application and outputs the corresponding tag signal STAG to the first selector 5, the second selector 8, and the code combining circuit 9.

If the image contained in the block image BG contains only a scanned image area, the first selector 5 and the second selector 8 connect the ADCT coding circuit 6 to the raster block circuit 3 and the code combining circuit 9 based on the tag signal STAG.

The ADCT coding circuit 6 performs DCT conversion, quantization processing, and Huffman coding of the image contained in the block image BG according to the coding technique typified by the JPEG baseline technique of a color fax standard coding technique.

More particularly, the ADCT coding circuit 6 contains a DTC operation circuit, a quantization circuit, and a Huffman coding circuit, and the DTC operation circuit executes DCT conversion of the image contained in the block image BG input through the first selector 5 and 64 DTC conversion coefficients.

The quantization circuit quantizes the 64 DTC conversion coefficients based on values in a quantization table predetermined.

The Huffman coding circuit codes the quantized DCT coefficients and outputs ADCT-coded data DADCT through the second selector 8 to the code combining circuit 9 as coded data DA/B.

If the image contained in the block image BG contains only a CG image area or both scanned image and CG image areas, the first selector 5 and the second selector 8 connect the block truncation coding circuit 7 to the raster block circuit 3 and the code combining circuit 9 based on the tag signal STAG.

The block truncation coding circuit 7 is a circuit for approximating the image contained in the input block image BG by a limited number of block representative values (N values), thereby coding.

In the block truncation coding, various block representative value determining methods are available as described in Related art.

The block truncation coding circuit 7 in the embodiment adopts the block truncation coding technique (QBTC-coding technique) by which the invention is characterized.

The QBTC coding technique is as follows: A histogram distribution of pixel values is calculated for each block image BG and is divided into N groups (N=integer) as many as the number of representative values and a representative value representing each group is calculated, then the N representative values are used as block representative values.

The QBTC coding technique will be discussed with reference to FIG. 2 to FIG. 14. In the description to follow, the block size of the block image BG is X×Y (X, Y: Integer).

Figure 2:
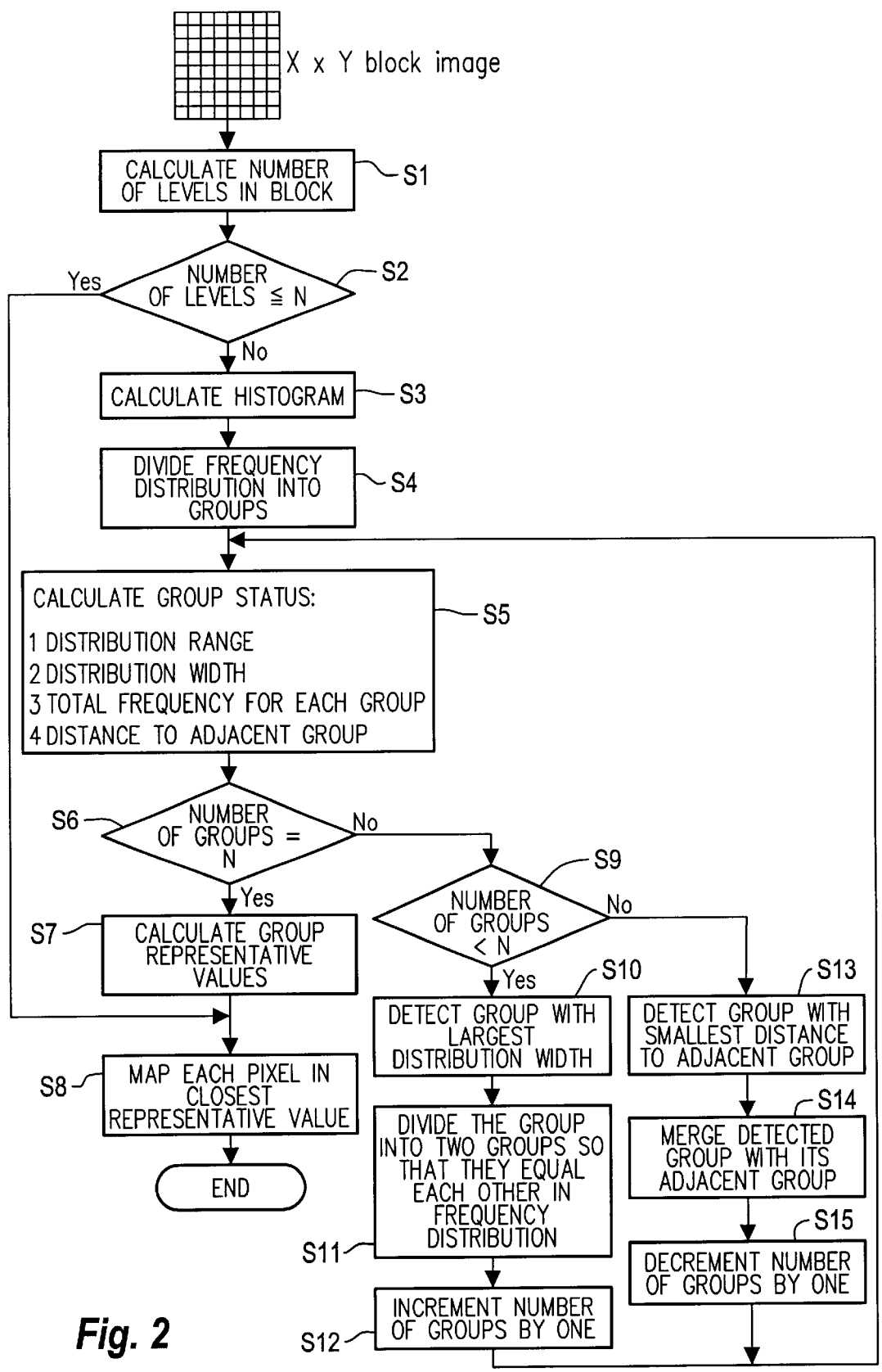
FIG. 2 is a coding processing flowchart in a first embodiment of the invention.

FIG. 2 is a flowchart of QBTC coding processing.

The block truncation coding circuit (QBTC coding circuit) 7 receives a block image BG having a size of X×Y through the first selector 5 from the raster block conversion circuit 3 and checks all pixel values in the block image BG.

How many types of pixel values exist in the block image BG is calculated, whereby the number of levels in the block image BG, CN, is calculated at step S1. In this case, the CN types of pixel values in the block image BG are pixel values VAL0–VALCN–-1.

Next, the calculated number of levels CN is compared with the number of block representative values N at step S2.

If it is determined at step S2 that the number of levels CN is equal to or less than the number of block representative values N (Yes at step S2), namely, $$CN \leq N$$

the block representative values of the block are the CN types of pixel values VAL014 VALCN-1 and pixel value VALX (X: 0 to CN-1) having the closest value is assigned (mapped) to each pixel at step S8, then the processing is terminated.

If it is determined at step S2 that the number of levels CN is greater than the number of block representative values N (No at step S2), namely, $$CN > N$$

a histogram frequency distribution of the pixel values in the block image BG is calculated at step S3.

Next, the calculated histogram frequency distribution is referenced, the pixel values are divided into pixel value groups, and the number of groups GN is calculated at step S4.

The dividing into groups will be discussed with reference to FIG. 3.

Figure 3A:
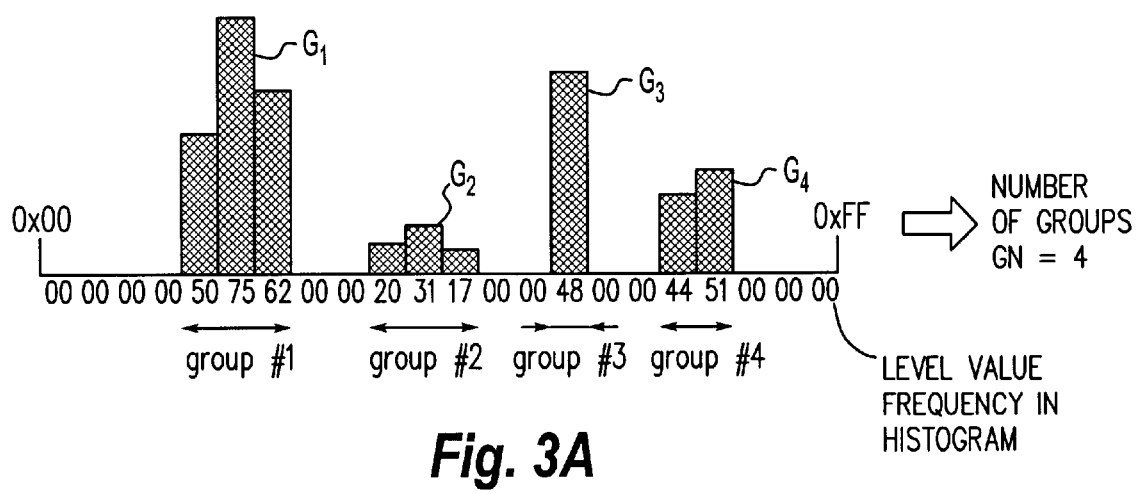
FIGS. 3A to 3C are schematic conceptual representation of dividing into groups.
Figure 3B:
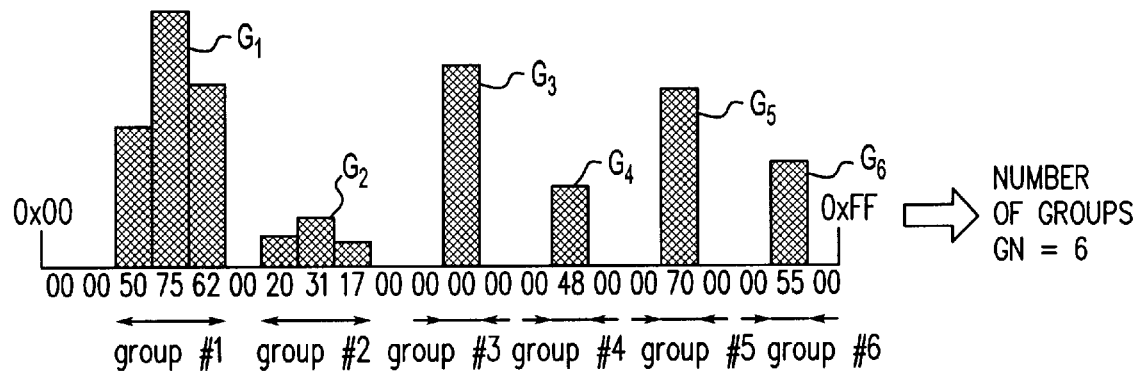
Figure 3C:
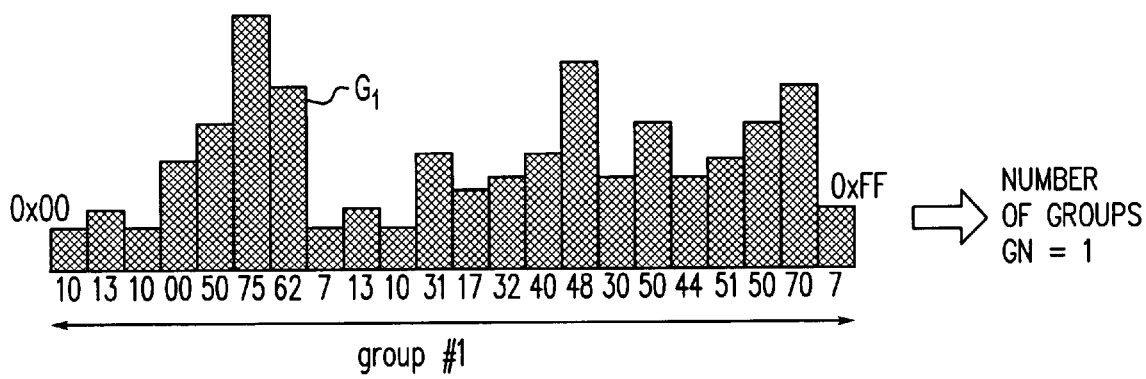

FIGS. 3A to 3C are schematic representation of dividing a histogram distribution into groups. In this case, pixel value VALX is represented in eight bits, namely, has a value ranging from 0 to 255. The vertical axis is the frequency of the same pixel value and the horizontal axis is pixel value VALX.

If the histogram frequency distribution extends over continuous pixel values, the continuous pixel values are assumed to be one group.

For example, if the frequency of pixel value VAL=5 (value on the vertical axis) is 0 and the frequency of pixel value VAL=11 is 0, when none of the frequencies of pixel value VAL=6 to pixel value VAL=10 are 0, pixel value VAL=6 to pixel value VAL=10 are assumed to be one group.

More specifically, as shown in FIG. 3A, the histogram frequency distribution is discrete and there are four frequency distribution portions extending over continuous pixel values (G1–G4), thus the number of groups GN becomes four.

As shown in FIG. 3B, the histogram frequency distribution is discrete and there are six frequency distribution portions extending over continuous pixel values (G1–G6), thus the number of groups GN becomes six.

Further, as shown in FIG. 3C, the histogram frequency distribution is continuous, the number of groups GN becomes one. In FIG. 3C, the pixel values VALX are distributed over the range of 0 to 255.

Next, for each pixel value group, group status values indicating the pixel value distribution state in the group are calculated at step S5.

Various group status values are possible. In the embodiment, the following four types of group status values are calculated:

(1) Group distribution range;

(2) Group distribution width;

(3) In-group frequency; and (4) Distance to adjacent group

The group distribution range is minimum pixel value VALMIN in the pixel value group to maximum pixel value VALMAX.

The group distribution width GW is the pixel value distribution range in the pixel value group and is expressed as $$GW = VALMAX - VALMIN$$

The in-group frequency is the total of the frequencies of the pixel values belonging to the pixel value group. The distance to adjacent group GD indicates how much the pixel value group is distant from the pixel value group having the minimum value VALMIN' in pixel value groups having the minimum value greater than the maximum value VALMAX in the pixel value group (in FIG. 3, positioned at the right of the histogram) and is expressed as $$GD = VALMIN' - VALMAX$$

Next, whether or not the number of groups GN equals the number of block representative values N is determined at step S6.

If it is determined at step S6 that they equal (Yes at step S6), as shown in FIG. 4A, a group representative value representing each pixel value group is calculated, the group representative values are used as block representative values at step S7, and block representative value VALX (X: 0 to N−1) having the closest value is assigned (mapped) to each pixel at step S8, then the processing is terminated.

In this case, various group representative value calculation methods are possible.

For example, the following are possible: Mean value in each pixel value group provided by finding the sum total of the pixel values in the pixel value group and dividing the sum total by the in-group frequency, the center value of the pixel value by which the frequency distribution in the pixel value group can be divided into two parts, value VAL1:1 for internally dividing the maximum value VALMAX and the minimum value VALMIN in the pixel value group into 1:1, namely, $$VAL1{:}1=(VALMAX+VALMIN)/2$$

If it is determined at step S6 that the number of groups GN does not equal the number of block representative values N (No at step S6), whether or not the number of groups GN is less than the number of block representative values N, namely, $$GN<N$$

is determined at step S9 to change the pixel value group configuration and increase or decrease the number of groups GN.

If it is determined at step S9 that the number of groups GN is less than the number of block representative values N (Yes at step S9), the number of groups GN is increased for changing the pixel value group configuration at steps S10–S12.

Various methods of increasing the number of pixel value groups GN are possible; in the embodiment, the following method is adopted for increasing the number of pixel value groups GN:

First, the group status values of all pixel value groups are referenced and as shown in FIG. 4B, a pixel value group with the largest group distribution width GW is detected at step S10.

The pixel value group with the largest group distribution width GW is divided into two pixel value groups at step S11.

Various methods of dividing one pixel value group into two parts are possible, such as a method of dividing one pixel value group into two parts so that the two divided pixel value groups equal each other in group distribution width GW and a method of dividing one pixel value group into two parts based on the pixel value equal to the mean value in the pixel value group.

The embodiment adopts a method of dividing one pixel value group into two parts based on the center value in the pixel value group.

More specifically, the detected group is divided into two pixel value groups so that they equal each other in total frequency.

Resultantly, the pixel value group with the largest distribution width in all pixel value groups is divided into two groups and the number of groups GN is incremented by one, namely, $$GN=GN+1$$

at step S12. Then, control again goes to step S5 and steps S5, S6, and S9–S12 are repeated until the new number of groups GN becomes equal to the number of block representative values N as a result of comparing them. If the new number of groups GN becomes equal to the number of block representative values N, as shown in FIG. 4A, a group representative value representing each pixel value group is calculated, the group representative values are used as block representative values at step S7, block representative value VALX (X: 0 to N−1) having the closest value is selected (mapped) for the pixel value of each pixel at step S8, and the index number corresponding to the block representative value VALX selected for each pixel is output as coded data DA/B, then the processing is terminated.

If it is determined at step S9 that the number of groups GN is equal to or greater than the number of block representative values N (No at step S9), the number of groups GN is decreased for changing the pixel value group configuration at steps S13–S15.

Various methods of decreasing the number of pixel value groups GN are possible; in the embodiment, the following method is adopted for decreasing the number of pixel value groups GN:

First, the group status values of all pixel value groups are referenced and as shown in FIG. 4C, a pixel value group with the smallest distance to adjacent group GD is detected at step S13.

The pixel value group with the smallest distance to adjacent group GD is merged with another pixel value group adjacent thereto to form one group at step S14.

Resultantly, the pixel value group with the smallest distance to adjacent group GD and its adjacent pixel value group in all pixel value groups are merged into one pixel value group and the number of groups GN is decremented by one, namely, $$GN=GN-1$$

at step S15. Then, control again goes to step S5 and steps S5, S6, S9, and S13–S15 are repeated until the new number of groups GN becomes equal to the number of block representative values N as a result of comparing them. If the new number of groups GN becomes equal to the number of block representative values N, as shown in FIG. 4A, a group representative value representing each pixel value group is calculated.

The group representative values are used as block representative values at step S7, block representative value VALX (X: 0 to N−1) having the closest value is selected (mapped) for the pixel value of each pixel at step S8, and the index number corresponding to the block representative value VALX selected for each pixel is output as coded data DA/B, then the processing is terminated.

Figure 5:
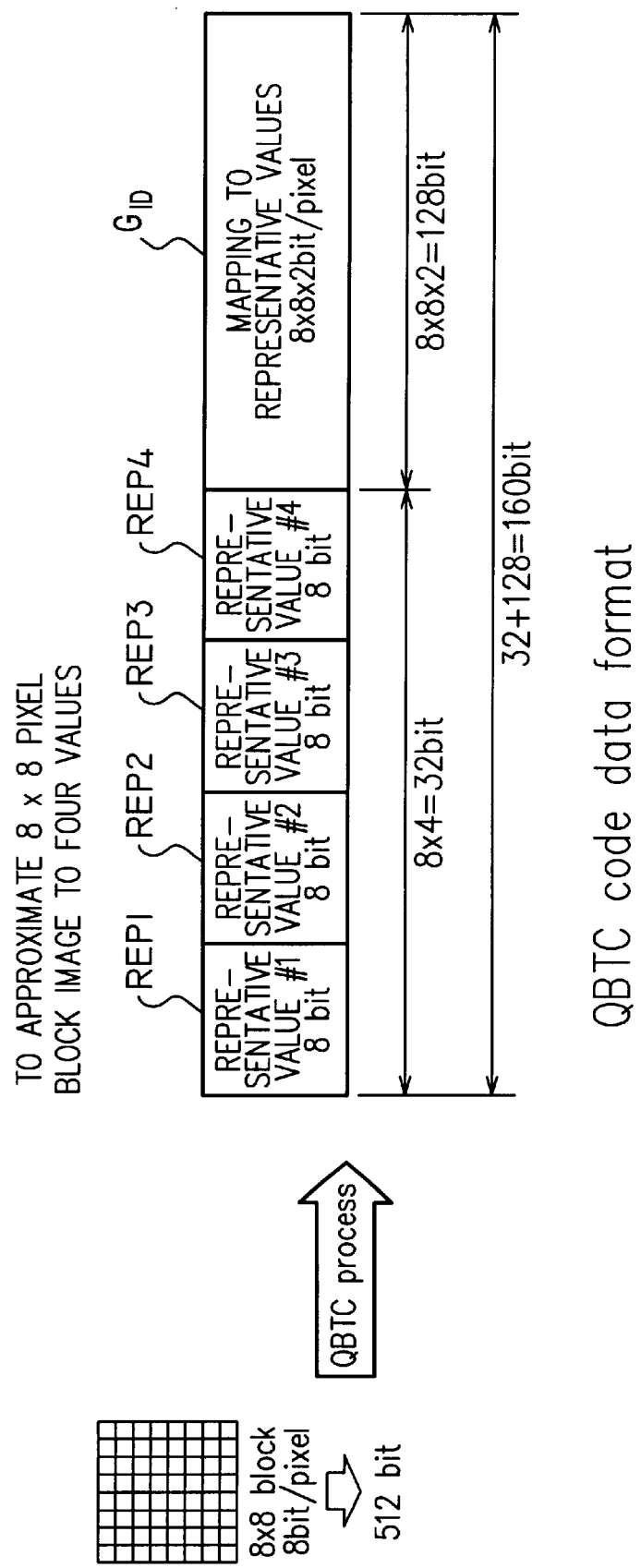
FIG. 5 is a schematic representation of a code data format.

FIG. 5 shows a data format of QBTC-coded data DA/B for each block image BG when the block size of each block image BG is 8×8 pixels and the number of block representative values N=4.

The data DA/B begins with block representative value data pieces REP1–REP4 indicating block representative values.

Since the pixel depth is eight [bits/pixel], the block representative value data pieces REP1–REP4 are represented each in eight [bits] and eight [bits]×4=32 [bits] in total.

The block representative value data pieces REP1–REP4 are followed by index number data GID of index number data indicating which block representative value each pixel is mapped to.

Since there are four block representative values, each index number data piece consists of two [bits] to represent one of the four block representative values.

Therefore, the index number data GID becomes $$\text{two [bits]} \times 64 = 128 \text{ [bits] in total}$$

because the number of pixels is 8×8=64.

Thus, the coded data amount per block image BG becomes $$32 \text{ [bits]} + 128 \text{ [bits]} = 160 \text{ [bits]}$$

in total of the block representative value data pieces REP1–REP4 and the index number data GID.

Therefore, the compression rate becomes $$160 \text{ [bits]}/512 \text{ [bits]} = 1/3.2$$

because the data amount of the original block image BG is $$8 \times 8 \times 8 \text{ [bits]} = 512 \text{ [bits]}$$

Figure 6:
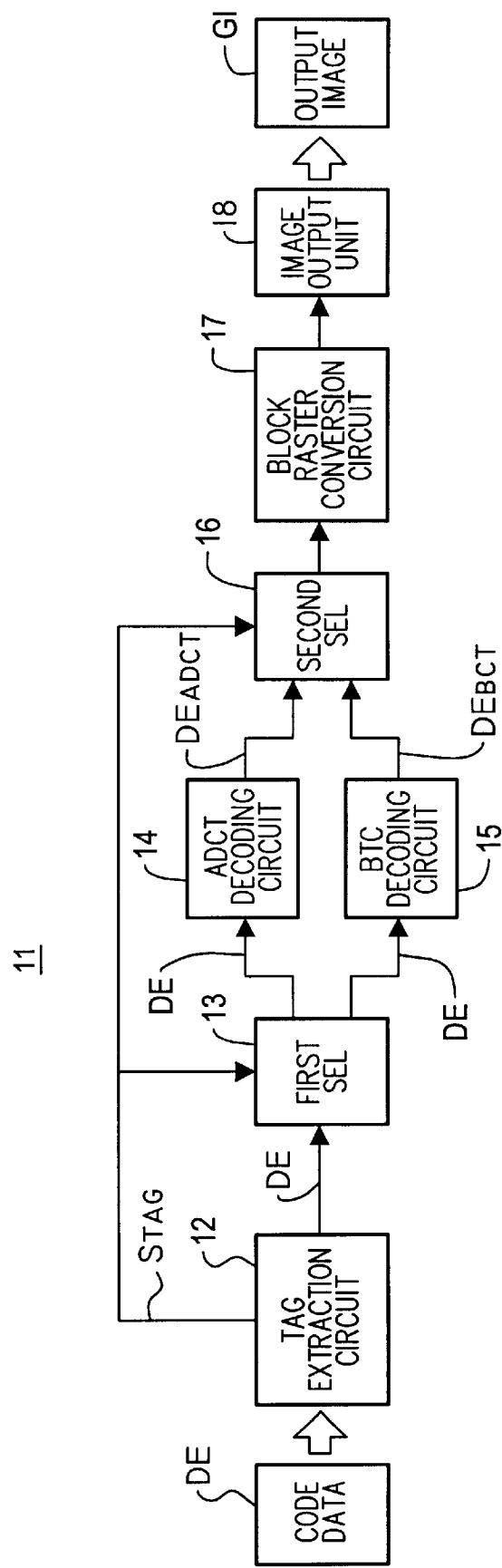
FIG. 6 is a block diagram of a schematic configuration of a decoding circuit.

FIG. 6 is a block diagram to show a schematic configuration of a decoding circuit of the image processing system of the first embodiment of the invention.

A decoding circuit 11 of the image processing system comprises a tag extraction circuit 12 for extracting and outputting a tag signal STAG for determining whether input code data DE is ADCT-coded or block-truncation-coded data from the code data DE and also outputting the code data DE intact, a first selector 13 for determining whether the code data DE contains ADCT-coded data DADCT or block-truncation-coded data DBCT based on the tag signal STAG extracted by the tag extraction circuit 12 and outputting the code data DE to either an ADCT decoding circuit 14 or a block truncation (BTC) decoding circuit 15 (described later), an ADCT decoding circuit 14 for performing ADCT decoding processing for the input code data DE and outputting ADCT-decoded data DEADCT, a block truncation decoding circuit 15 for performing block truncation decoding processing for the input code data DE and outputting block-truncation-decoded data DEBCT, a second selector 16 for outputting either the input ADCT-decoded data DEADCT or block-truncation-decoded data DEBCT as block image BG1 based on the tag signal STAG, a block raster conversion circuit 17 for converting the input block image BG1 into a raster image, and an image output unit 18 for forming an image on paper, etc., based on the raster image, thereby outputting output image G1 or writing the raster image directly into memory, thereby outputting output image G1.

The operation of the described decoding circuit is as follows:

The tag extraction circuit 12 of the decoding circuit 11 of the image processing system extracts the tag signal STAG from the code data DE and outputs the extracted tag signal to the first selector 13 and the second selector 16. It also outputs the code data DE intact to the ADCT decoding circuit 14 and the block truncation decoding circuit 15.

The first selector 13 outputs the code data DE containing ADCT-coded data DADCT to the ADCT decoding circuit 14 and the code data DE containing block-truncation-coded data DBCT to the block truncation decoding circuit 15 based on the tag signal STAG extracted by the tag extraction circuit 12.

The ADCT decoding circuit 14 performs ADCT decoding processing for the input code data DE and outputs ADCT-decoded data DEADCT to the second selector 16.

The block truncation decoding circuit 15 performs block truncation decoding processing for the input code data DE and outputs block-truncation-decoded data DEBCT.

The second selector 16 outputs either the input ADCT-decoded data DEADCT or block-truncation-decoded data DEBCT to the block raster conversion circuit 17 as block image BGI based on the tag signal STAG.

The block raster conversion circuit 17 converts the input block image BG1 into a raster image and outputs the raster image to the image output unit 18.

The image output unit 18 forms an image on paper, etc., based on the raster image, thereby outputting output image G1 or writes the raster image directly into the memory, thereby outputting output image G1.

Figure 7:
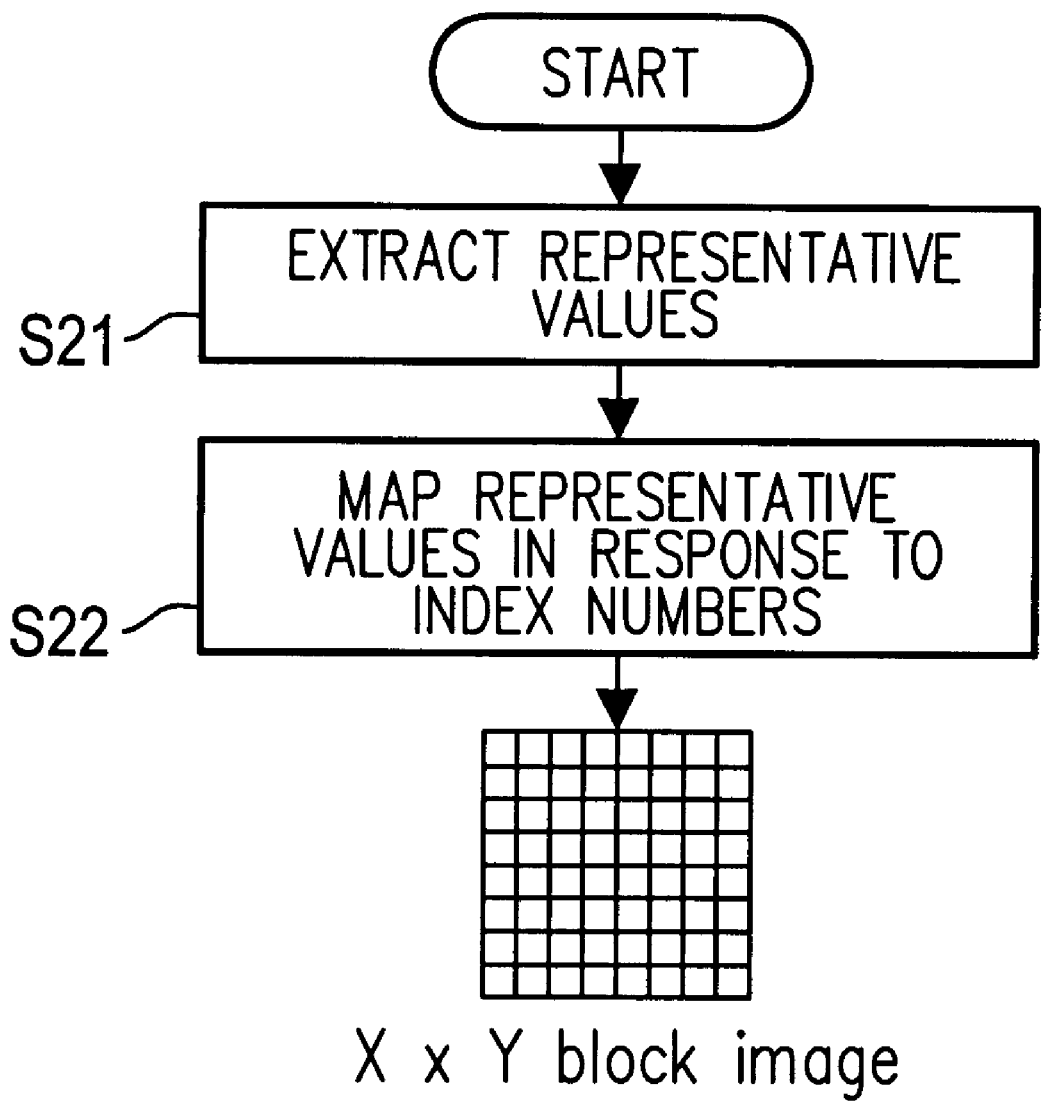
FIG. 7 is a decoding processing flowchart in the first embodiment of the invention.

FIG. 7 is a flowchart of QBTC decoding processing in the block truncation decoding circuit 15.

The block truncation decoding circuit 15 extracts block representative value data (block representative value data pieces REP1–REP4 in the example described above) from the input code data DE at step S21.

Subsequently, the block truncation decoding circuit 15 extracts as many index data pieces as the number of pixels of the block image BG1 from the index number data (index number data GID in the example described above).

It assigns the block representative value data pieces to the corresponding pixel positions in response to the extracted index data, thereby reproducing image data of a 1-block image at step S22.

Thus, the QBTC decoding processing can be carried out as very simple processing as compared with the coding processing.

Thus, the time required for the decoding processing is shortened, so that decompression processing can be performed at high speed.

As described above, according to the first embodiment, a histogram distribution for each block image is divided into pixel value groups and the number of groups is increased or decreased in a loop repeatedly until the number of pixel value groups becomes equal to the number of block representative values, whereby the optimum group configuration for the histogram distribution of the block image can be provided.

Therefore, the coding technique capable of minimizing quality degradation of a decomposed image and providing a high-quality image (QBTC coding technique) can be accomplished even for image data containing mixed CG image and scanned image areas.

<Second Embodiment>

Next, a second embodiment of the invention will be discussed.

The description to follow centers around a block truncation coding circuit for a QBTC coding technique. Parts identical with those in the first embodiment are denoted by the same reference numerals in the second embodiment and will not be discussed again in detail.

In the description to follow, the block size of a block image BG is 8×8 pixels and the number of block representative values N=4.

In the QBTC coding technique in the second embodiment, the difference value between high-density area distribution mean value and maximum value and the difference value between low-density area distribution mean value and minimum value are calculated for each block image BG and the histogram distribution state for each block image BG is classified into four categories from the correlation among the values, then a block representative value calculation method responsive to each histogram distribution state is applied.

Processing after block representative value determination, such as mapping of pixel values in each block image BG to the block representative values, is similar to that in the first embodiment.

In the second embodiment, the histogram distribution state can be classified into the following four categories considering a discontinuous, discrete pixel value distribution state on a histogram distribution:

(1) High/low area discrete distribution;

(2) High area discrete distribution;

(3) Low area discrete distribution; and (4) No discrete distribution

Figure 8:
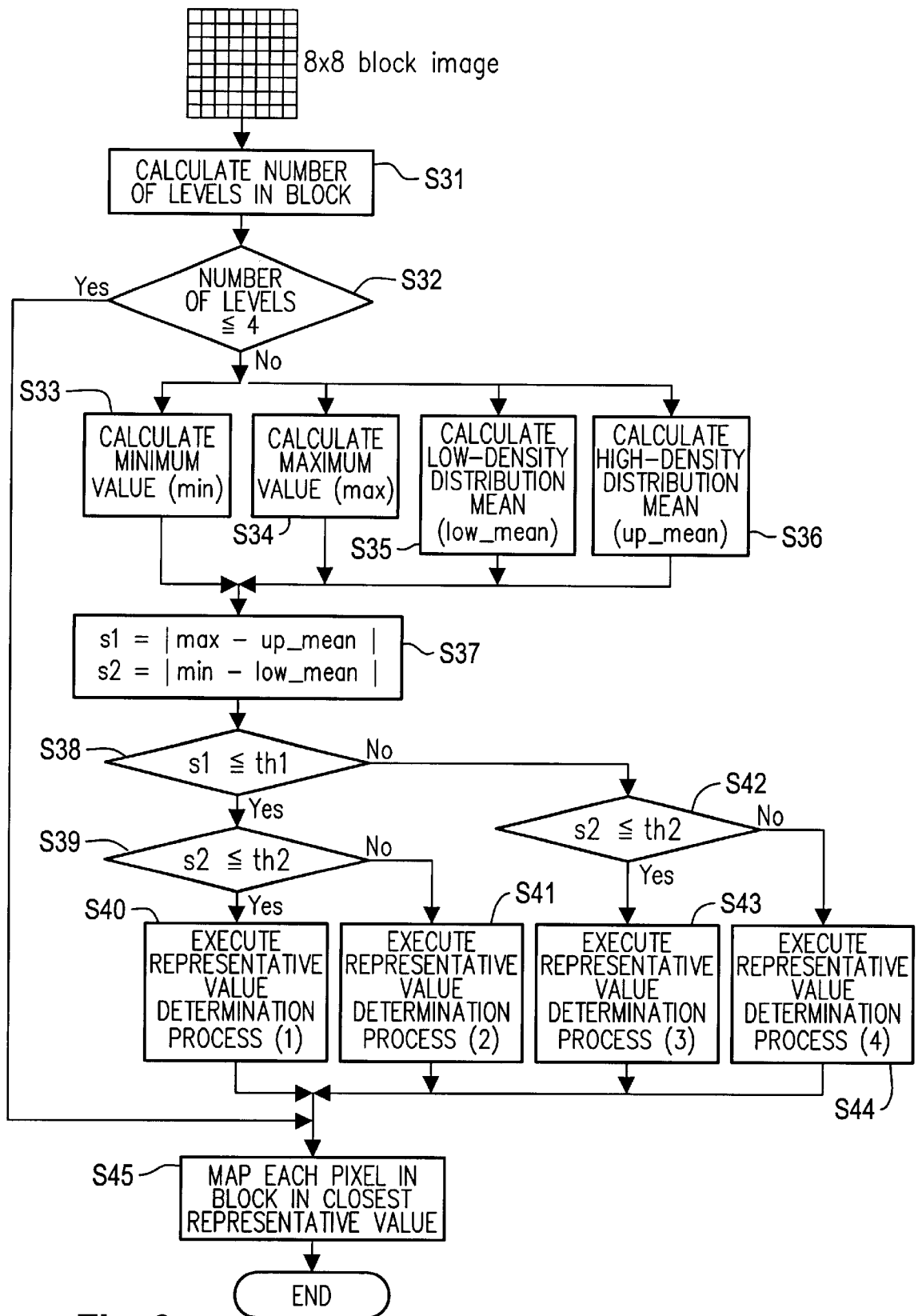
FIG. 8 is a coding processing flowchart in a second embodiment of the invention.

FIG. 8 is a processing flowchart of the QBTC coding technique in the second embodiment.

A block truncation coding circuit (QBTC coding circuit) 7 receives a block image BG having a size of 8×8 through the first selector 5 from the raster block conversion circuit 3 and checks all pixel values in the block image BG.

How many types of pixel values exist in the block image BG is calculated, whereby the number of levels in the block image BG, CN, is calculated at step S31. In this case, the CN types of pixel values in the block image BG are pixel values VAL0–VALCN−1.

Next, the calculated number of levels CN is compared with the number of block representative values N=4 at step S32.

If it is determined at step S32 that the number of levels CN is equal to or less than the number of block representative values N=4 (Yes at step S32), namely, $$CN \leq N=4$$

the block representative values of the block are the CN types of pixel values VAL0–VALCN−1 and pixel value VALX (X: 0 to CN−1) having the closest value is assigned (mapped) to each pixel at step S45, then the processing is terminated.

If it is determined at step S32 that the number of levels CN is greater than the number of block representative values N (No at step S32), namely, $$CN > N$$

the pixel values in the block image BG are referenced and the following four block representative values are determined at steps S33–S36:

(1) Calculate minimum value min at step S33
The minimum value min is the minimum value of all pixel values in the block image BG.

(2) Calculate maximum value max at step S34
The maximum value max is the maximum value of all pixel values in the block image BG.

(3) Calculate low-density area distribution mean low_mean at step S35
The low-density area distribution mean low_mean is a mean value of comparatively low pixel values.

(4) Calculate high-density area distribution mean up_mean at step S36
The high-density area distribution mean up_mean is a mean value of comparatively high pixel values.

Figure 9:
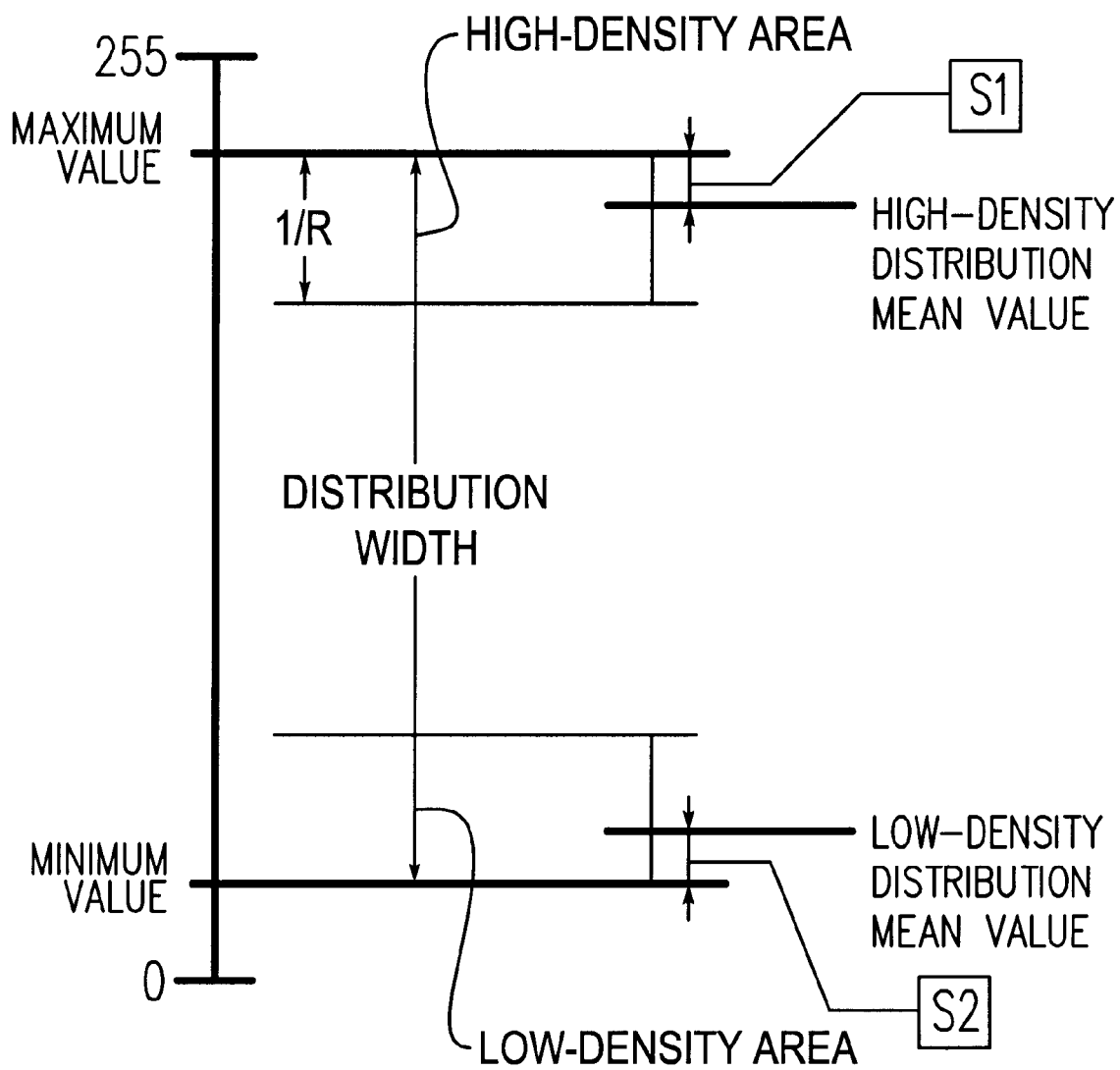
FIG. 9 is a schematic representation of a calculation concept of block status values in the second embodiment of the invention.

FIG. 9 is a schematic representation of calculation of the low-density area distribution mean low_mean and the high-density area distribution mean up_mean.

Assuming that the difference value between the maximum value max and the minimum value min of the pixel values in the block image BG is distribution width WD of the pixel values in the block image BG, the range of value X1 expressed as $$\text{minimum value min} \leq X1 < \text{minimum value min} + (\text{distribution width } WD/R)$$

is a low-density area, and the range of value X2 expressed as $$\text{maximum value max} - (\text{distribution width } WD/R) \leq X2 < \text{maximum value max}$$

is a high-density area.

The mean values of the pixel values belonging to the ranges will be called low-density area distribution mean low_mean and high-density area distribution mean up_mean.

Next, to classify the histogram distribution state of the pixel values in the block image BG from the minimum value min, the maximum value max, the low-density area distribution mean low_mean, and the high-density area distribution mean up_mean, absolute values s1 and s2 are found based on the minimum value min, the maximum value max, the low-density area distribution mean low_mean, and the high-density area distribution mean up_mean at step S37.

$$s1 = |\text{max} - \text{up\_mean}|$$

$$s2 = |\text{min} - \text{low\_mean}|$$

By the way, if the absolute value s1 of the difference value between the maximum value max and the high-density area distribution mean up_mean is small in the histogram distribution of the pixel values in the block image, it is considered that the number of the pixel values distributed over the high-density area in the histogram distribution is large and that a large discrete distribution exists in the vicinity of the maximum value max.

Likewise, if the absolute value s2 of the difference value between the minimum value min and the low-density area distribution mean low_mean is small in the histogram distribution of the pixel values in the block image, it is considered that the number of the pixel values distributed over the low-density area in the histogram distribution is large and that a large discrete distribution exists in the vicinity of the minimum value min.

Thus, the histogram distribution state can be classified by comparing the absolute values s1 and s2 with first threshold value th1 and second threshold value th1 preset.

More specifically, first whether or not the absolute value s1 is equal to or less than the first threshold value th1 is determined at step S37.

If it is determined at step S37 that the absolute value s1 is equal to or less than the first threshold value th1 (Yes at step S37), whether or not the absolute value s2 is equal to or less than the second threshold value th2 is determined at step S39.

If it is determined at step S39 that the absolute value s2 is equal to or less than the second threshold value th2 (Yes at step S39), control goes to step S40 for performing a first representative value determination process (indicated as representative value determination process (1) in the figure).

The first representative value determination process is a block representative value determination process executed when it is determined that a large discrete distribution exists each in the vicinity of the maximum value max and in the vicinity of the minimum value min in the histogram distribution of the pixel values in the block image.

The pixel value indicating the large discrete distribution corresponds to the pixels occupying a large area of image corresponding to the block image BG, thus the pixel value is adopted as a block representative value as it is.

In a decomposed image, the block representative value is restored intact; resultantly, a good decomposed image can be provided.

That is, because of having a large distribution in the vicinity of the maximum value max in the histogram distribution, the high-density area distribution mean up_mean is adopted as one of block representative values as it is.

Because of having a large distribution in the vicinity of the minimum value min in the histogram distribution, the low-density area distribution mean low_mean is adopted as one of block representative values as it is.

Thus, the two block representative values are determined and two remaining block representative values may be determined in the distribution range except the two already determined values in the histogram distribution.

Specifically, two remaining block representative values are determined in the range of the low-density area distribution mean low_mean to the high-density area distribution mean up_mean.

That is, one value representing the whole range of the low-density area distribution mean low_mean to the high-density area distribution mean up_mean is determined and the range of the low-density area distribution mean low_mean to the high-density area distribution mean up_mean is divided into two parts based on the value, then values representing the two division ranges are set therein, thereby determining the two remaining block representative values.

Figure 10:
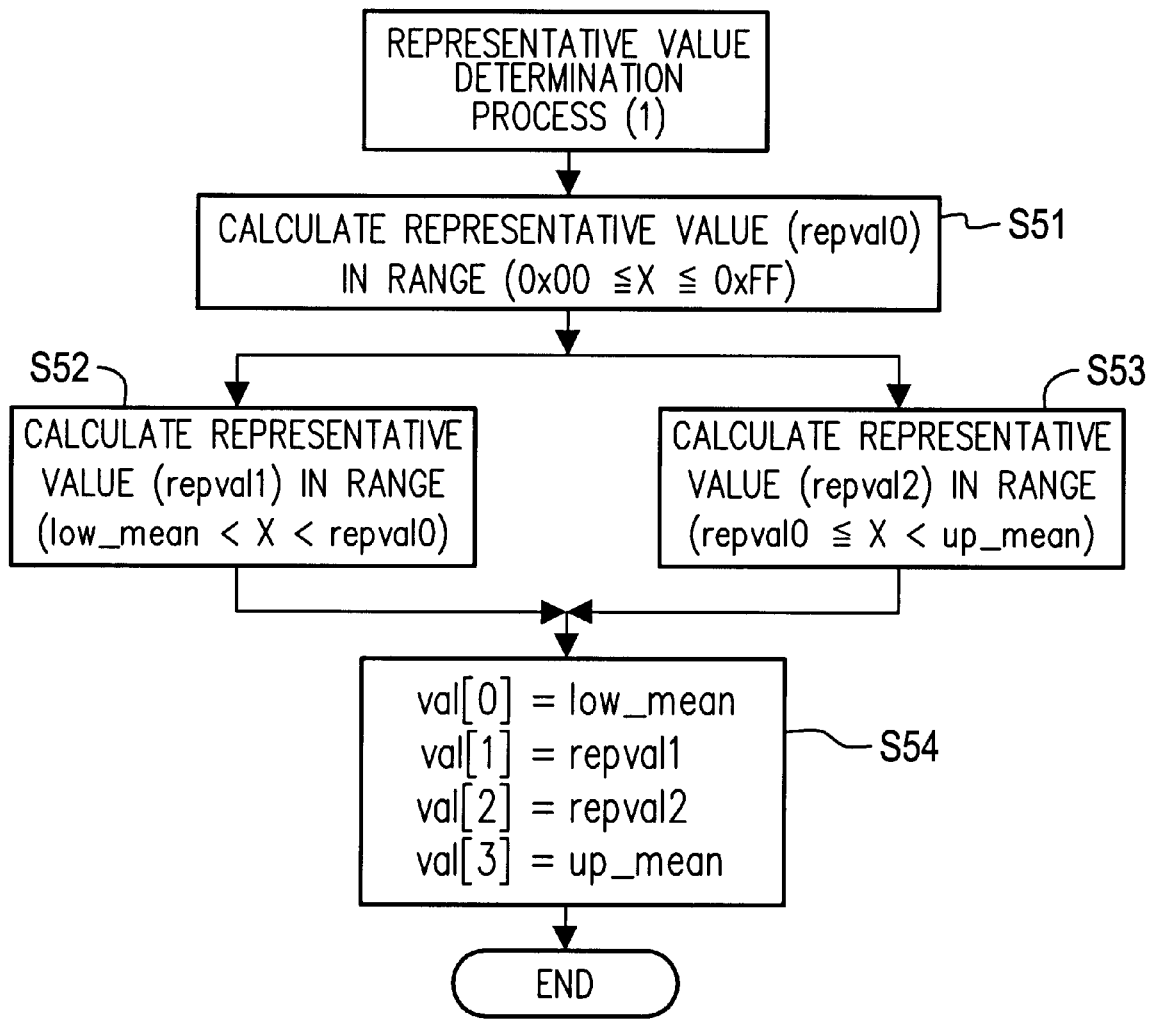
FIG. 10 is a flowchart of a first representative value determination process.

FIG. 10 is a flowchart of the first representative value determination process.

First, all pixel values in the block image BG are referenced and value repva10 representing the block image BG is calculated in the pixel value range of 0 (=0x00) to 255 (=0xFF) at step S51. For example, mean value, center value, most frequently occurring value, etc., of the pixel values in the block image BG is used as the value repva10.

Next, the calculated value repvalo is used to divide the histogram distribution range of the low-density area distribution mean low_mean to the high-density area distribution mean up_mean into two parts and the values representing the two division ranges, namely, block representative values are determined.

More specifically, the pixel values in the block are referenced and block representative value VAL[1]=repva11 is calculated in the pixel value X range of the low-density area distribution mean low_mean to the value repva10, namely, low_mean<$X \leq$repva10 at step S52. To calculate the block representative value VAL[1]=repva11, mean value, center value, most frequently occurring value, etc., of the pixel values in the range is used as in calculation of the value repva10.

Likewise, block representative value VAL[2]=repva12 is calculated in the pixel value X range of the value repva10 to the high-density area distribution mean up_mean, namely, repva10<$X \leq$up_mean at step S53. To calculate the block representative value VAL[2]=repva12, mean value, center value, most frequently occurring value, etc., of the pixel values in the range is used as in calculation of the value repva10.

Resultantly, the four block representative values VAL[0] to VAL[3] are determined at step S54 as follows:

VAL[0]=low_mean
VAL[1]=repva11
VAL[2]=repva12
VAL[3]=up_mean

If it is determined at step S39 that the absolute value s2 is greater than the second threshold value th2 (No at step S39), control goes to step S41 for performing a second representative value determination process (indicated as representative value determination process (2) in the figure).

The second representative value determination process is a block representative value determination process executed when it is determined that a large discrete distribution exists in the vicinity of the maximum value max in the histogram distribution of the pixel values in the block image.

In this case, because of having a large distribution in the vicinity of the maximum value max in the histogram distribution, the high-density area distribution mean up_mean is adopted as one of block representative values as it is.

Thus, the one block representative value is determined and three remaining block representative values may be determined in the distribution range except the already determined value in the histogram distribution.

Specifically, three remaining block representative values are determined in the range of the minimum value min to the high-density area distribution mean up_mean.

That is, one value repva11 representing the whole range of the minimum value min to the high-density area distribution mean up_mean is determined and maximum value max1 and minimum value min1 in the range are found.

The absolute value of the difference between the value repva11 and the maximum value max1 and that between the value repva11 and the minimum value min1 are found as r1 and r2 respectively.

The histogram distribution state in the range of the minimum value min to the high-density area distribution mean up_mean is classified into the three categories according to the difference absolute values r1 and r2 and a method of dividing the range into three parts is selected from three methods in response to the distribution state.

Figure 11A:
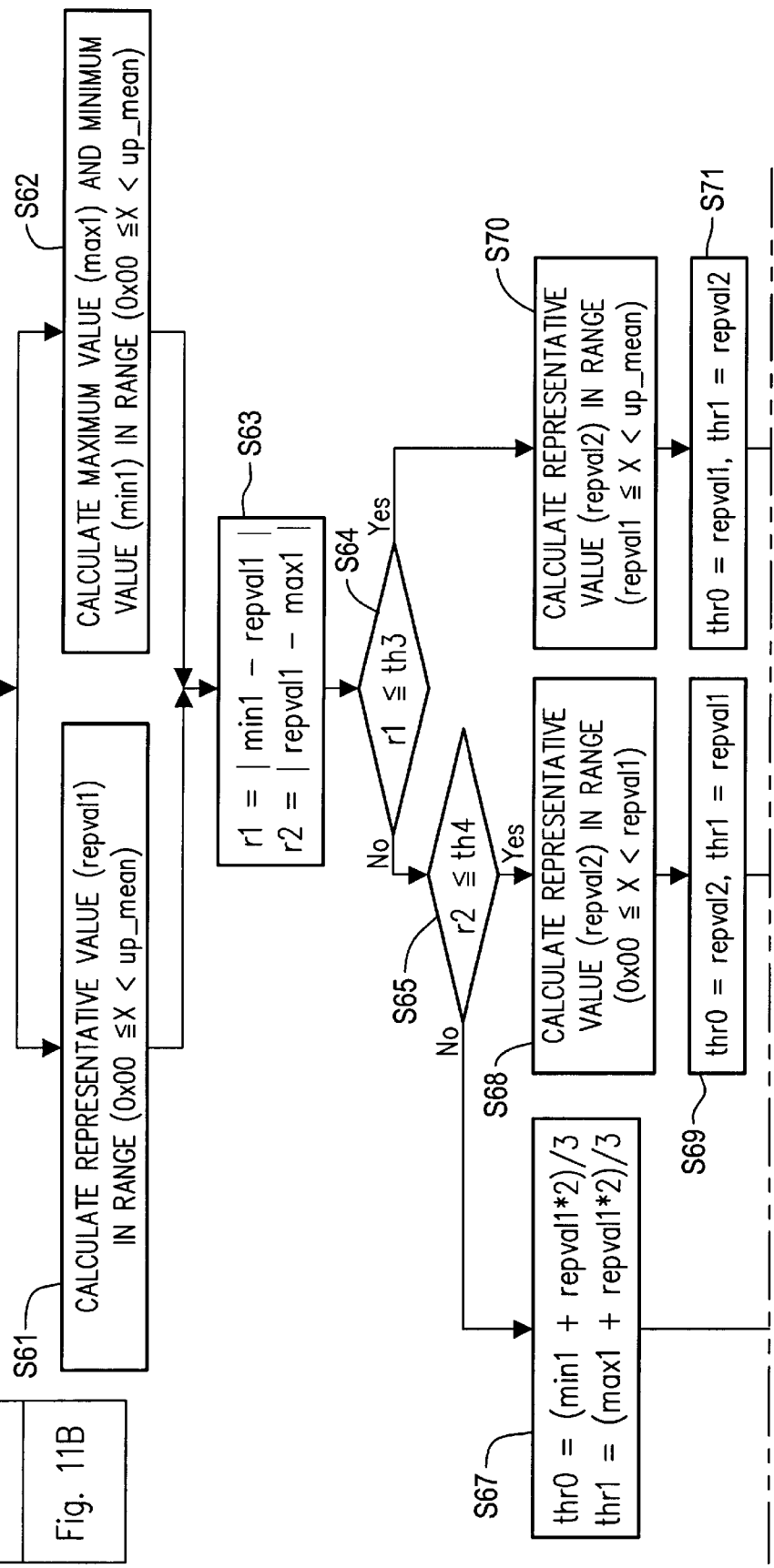
FIG. 11 is a flowchart of a second representative value determination process.
Figure 11B:
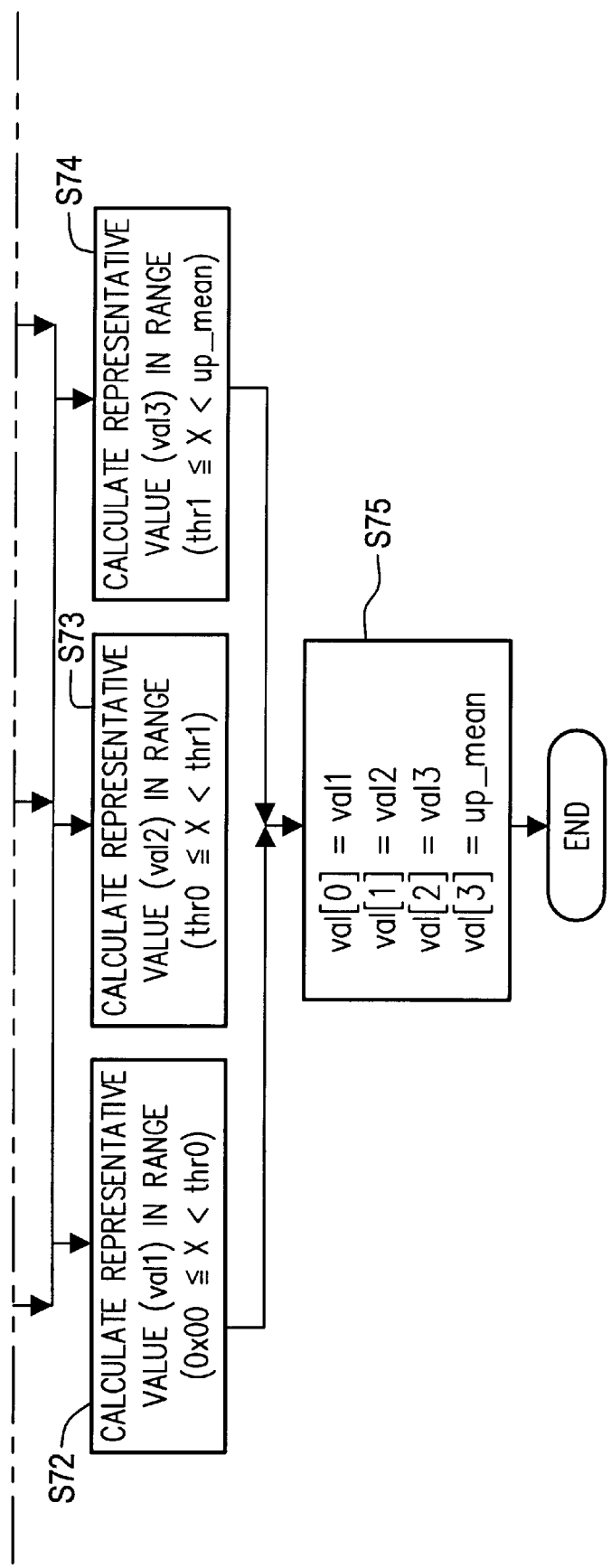

FIG. 11 is a flowchart of the second representative value determination process.

First, in the histogram distribution range in the pixel value X range of 0 (=0x00) to the high-density area distribution mean up_mean, the value repva11 representing the range is determined.

More specifically, the pixel values in the block are referenced and the value repva11 representing the range is calculated in the pixel value X range of 0 (=0x00) to the high-density area distribution mean up_mean, namely, 0x00<$X \leq$up_mean at step S61. Mean value, center value, most frequently occurring value, etc., of the pixel values in the range is used to calculate the representative value repva11.

Next, the maximum value max1 and the minimum value min1 are found in the pixel value X range of 0 (=0x00) to the high-density area distribution mean up_mean at step S62.

Subsequently, the absolute value of the difference between the representative value repva11 and the maximum value max1 and that between the value repva11 and the minimum value min1, r1 and r2, are found according to the following expressions at step S63:

r1=|min1−$repva11$| r2=|$repva11$−max1|

By the way, if the absolute value r1 of the difference between the minimum value min1 in the range and the representative value repva11 in the range is small, it can be judged that the pixel value histogram distribution in the pixel value range is not a form close to a normal distribution and is a distribution leaning in the minimum value min direction.

Likewise, if the absolute value r2 of the difference between the maximum value max1 in the range and the representative value repva11 in the range is small, it can be judged that the pixel value histogram distribution in the pixel value range is not a form close to a normal distribution and is a distribution leaning in the maximum value max direction.

If the absolute values of the differences, r1 and r2, are both large, it can be judged that the pixel value histogram distribution in the range is a comparatively less leaning form close to a normal distribution or a flat distribution.

Thus, the histogram distribution state in the range can be classified by comparing the difference absolute values r1 and r2 with predetermined threshold values th3 and th4.

Then, first whether or not the difference absolute value r1 is equal to or less than the threshold value th3, namely, $$r1 \leq th3$$

is determined at step S64.

If it is determined at step S64 that the difference absolute value r1 is equal to or less than the threshold value th3, namely, $$r1 \leq th3$$

(Yes at step S64), it can be judged that the histogram distribution in the pixel value range is a distribution form leaning in the minimum value min1 direction.

Thus, to divide the range into three parts, in the pixel value X range of repva11 to the high-density area distribution mean up_mean, namely, $$repva11 < X \leq up\_mean$$

value repva12 representing the range is calculated at step S70.

First division range value thr0=repva11 and second division range value thr1=repva12 at step S71.

Next, block representative value VAL[0]=VAL1 is calculated in the pixel value X range of 0 (=00x0) to the first division range value thr0 repva11 at step S72. To calculate the block representative value VAL[0]=VAL1, mean value, center value, etc., of the pixel values in the range is used.

Likewise, block representative value VAL[1]=VAL2 is calculated in the pixel value X range of the first division range value thr0=repva11 to the second division range value thr1=repva12 at step S73. To calculate the block representative value VAL[1]=VAL2, mean value, center value, etc., of the pixel values in the range is used.

Likewise, block representative value VAL[2]=VAL3 is calculated in the pixel value X range of the second division range value thr1=repva12 to the high-density area distribution mean up_mean at step S74. To calculate the block representative value VAL[2]=VAL3, mean value, center value, etc., of the pixel values in the range is used.

Resultantly, the four block representative values VAL[0] to VAL[3] are determined at step S75 as follows:

VAL[0]=VAL1
VAL[1]=VAL2
VAL[2]=VAL3
VAL[3]=up_mean

If it is determined at step S64 that the difference absolute value r1 is greater than the threshold value th3, namely, $$r1 > th3$$

(No at step S64), control goes to step S65 at which whether or not the difference absolute value r2 is equal to or less than the threshold value th4, namely, $$r2 \leq th4$$

is determined.

If it is determined at step S65 that the difference absolute value r2 is equal to or less than the threshold value th4, namely, $$r2 \leq th4$$

(Yes at step S65), it can be judged that the histogram distribution in the pixel value range is a distribution form leaning in the maximum value max1 direction.

Thus, to divide the range into three parts, in the pixel value X range of 0 (=0x00) to the value repva11, namely, $$0x00 < X \leq repva11$$

the value repva12 representing the range is calculated at step S68.

First division range value thr0=repva12 and second division range value thr1=repva11 at step S69.

Next, block representative value VAL[0]=VAL1 is calculated in the pixel value X range of 0 (=00x0) to the first division range value thr0=repva12 at step S72. To calculate the block representative value VAL[0]=VAL1, mean value, center value, etc., of the pixel values in the range is used.

Likewise, block representative value VAL[1]=VAL2 is calculated in the pixel value X range of the first division range value thr0=repva12 to the second division range value thr1=repva11 at step S73. To calculate the block representative value VAL[1]=VAL2, mean value, center value, etc., of the pixel values in the range is used.

Likewise, block representative value VAL[2]=VAL3 is calculated in the pixel value X range of the second division range value thr1=repva11 to the high-density area distribution mean up_mean at step S74. To calculate the block representative value VAL[2]=VAL3, mean value, center value, etc., of the pixel values in the range is used.

Resultantly, the four block representative values VAL[0] to VAL[3] are determined at step S75 as follows:

VAL[0]=VAL1
VAL[1]=VAL2
VAL[2]=VAL3
VAL[3]=up_mean

If it is determined at step S65 that the difference absolute value r2 is greater than the threshold value th4, namely, $$r2 > th4$$

(No at step S65), it can be judged that the histogram distribution in the pixel value range less leans in the minimum min1 or maximum max1 direction and is a form comparatively close to a normal distribution or a flat distribution.

Thus, to divide the range into three parts, various methods are possible; in the embodiment, first division range value thr0=(min1+repva11×2)/3
second division range value thr1=(repva12×2+max1)/3 are found at step S67 and these division range values thr0 and thr1 are used to divide the range into three parts.

Block representative value VAL[0]=VAL1 is calculated in the pixel value X range of 0 (=0x00) to the first division range value thr0=(min1+repva11×2)/3, namely, $$0x00 < X \leq (min1 + repva11 \times 2)/3$$

at step S72. To calculate the block representative value VAL[0]=VAL1, mean value, center value, etc., of the pixel values in the range is used.

Likewise, block representative value VAL[1]=VAL2 is calculated in the pixel value X range of the first division range value thr0=(min1+repva11×2)/3 to the second division range value thr1=(repva12×2+max1)/3 at step S73. To calculate the block representative value VAL[1]=VAL2, mean value, center value, etc., of the pixel values in the range is used.

Likewise, block representative value VAL[2]=VAL3 is calculated in the pixel value X range of the second division range value thr1=(repva12×2+max1)/3 to the high-density area distribution mean up_mean at step S74. To calculate the block representative value VAL[2]=VAL3, mean value, center value, etc., of the pixel values in the range is used.

Resultantly, the four block representative values VAL[0] to VAL[3] are determined at step S75 as follows:

VAL[0]=VAL1
VAL[1]=VAL2
VAL[2]=VAL3
VAL[3]=up_mean

If it is determined at step S38 that the absolute value s1 is greater than the first threshold value th1 (No at step S38), control goes to step S42 at which whether or not the absolute value s2 is equal to or greater than the second threshold value th2 is determined at step S42.

If it is determined at step S42 that the absolute value s2 is equal to or less than the second threshold value th2 (Yes at step S42), control goes to step 43 for performing a third representative value determination process (indicated as representative value determination process (3) in the figure).

The third representative value determination process is a block representative value determination process executed when it is determined that a large discrete distribution exists in the vicinity of the minimum value min in the histogram distribution of the pixel values in the block image.

In this case, because of having a large distribution in the vicinity of the minimum value min in the histogram distribution, the low-density area distribution mean low_mean is adopted as one of block representative values as it is.

Thus, the one block representative value is determined and three remaining block representative values may be determined in the distribution range except the already determined value in the histogram distribution.

Specifically, three remaining representative values are determined in the range of the low-density area distribution mean low_mean to the maximum value max.

That is, one value repva11 representing the whole range of the low-density area distribution mean low_mean to the maximum value max is determined and maximum value max1 and minimum value min1 in the range are found.

The absolute value of the difference between the value repva11 and the maximum value max1 and that between the value repva11 and the minimum value min1 are found as r1 and r2 respectively.

The histogram distribution state in the range of the minimum value min to the high-density area distribution mean up_mean is classified into the three categories according to the difference absolute values r1 and r2 and a method of dividing the range into three parts is selected from three methods in response to the distribution state.

Figures 12, 12A:
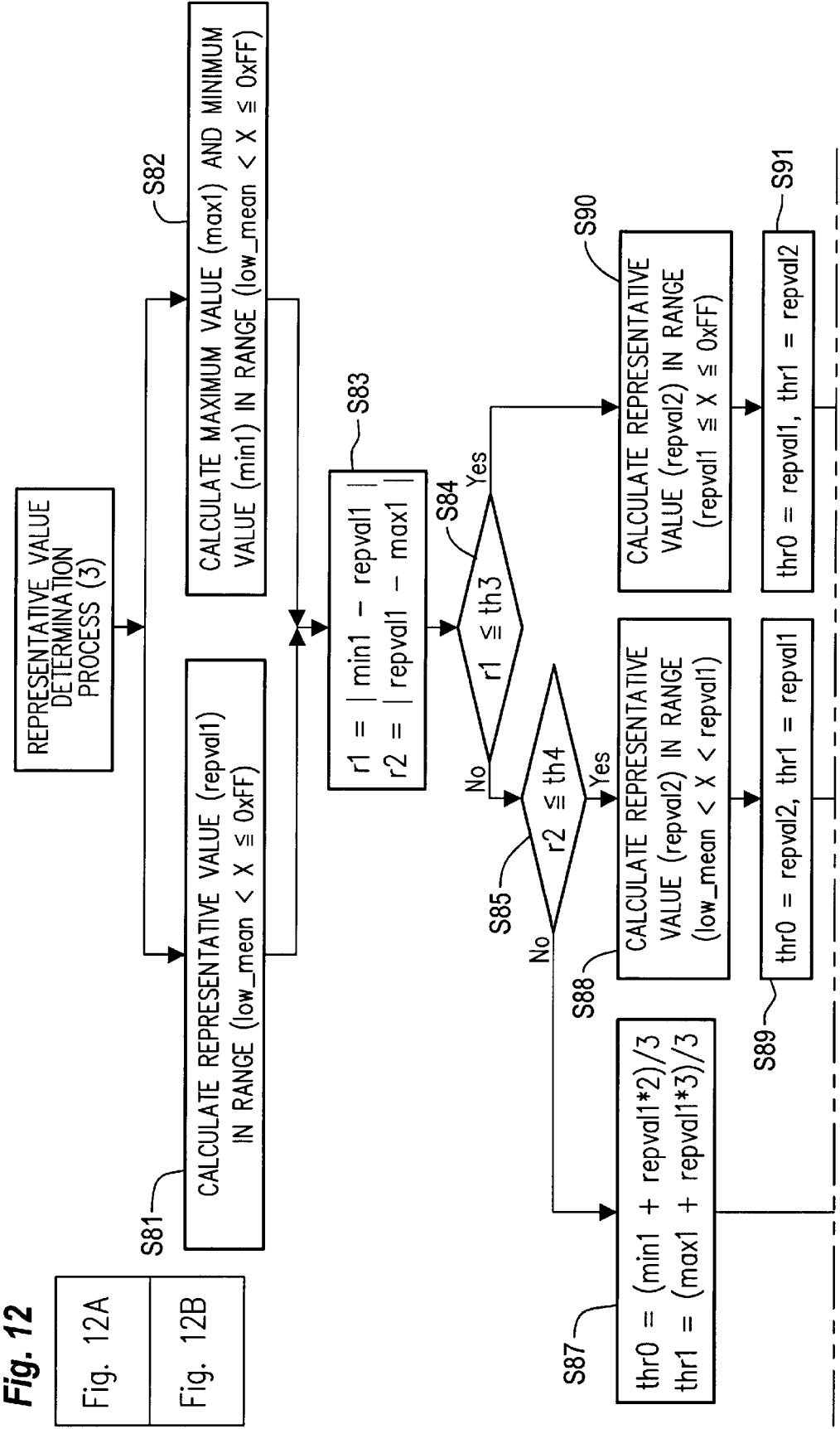
FIG. 12 is a flowchart of a third representative value determination process.
Figure 12B:
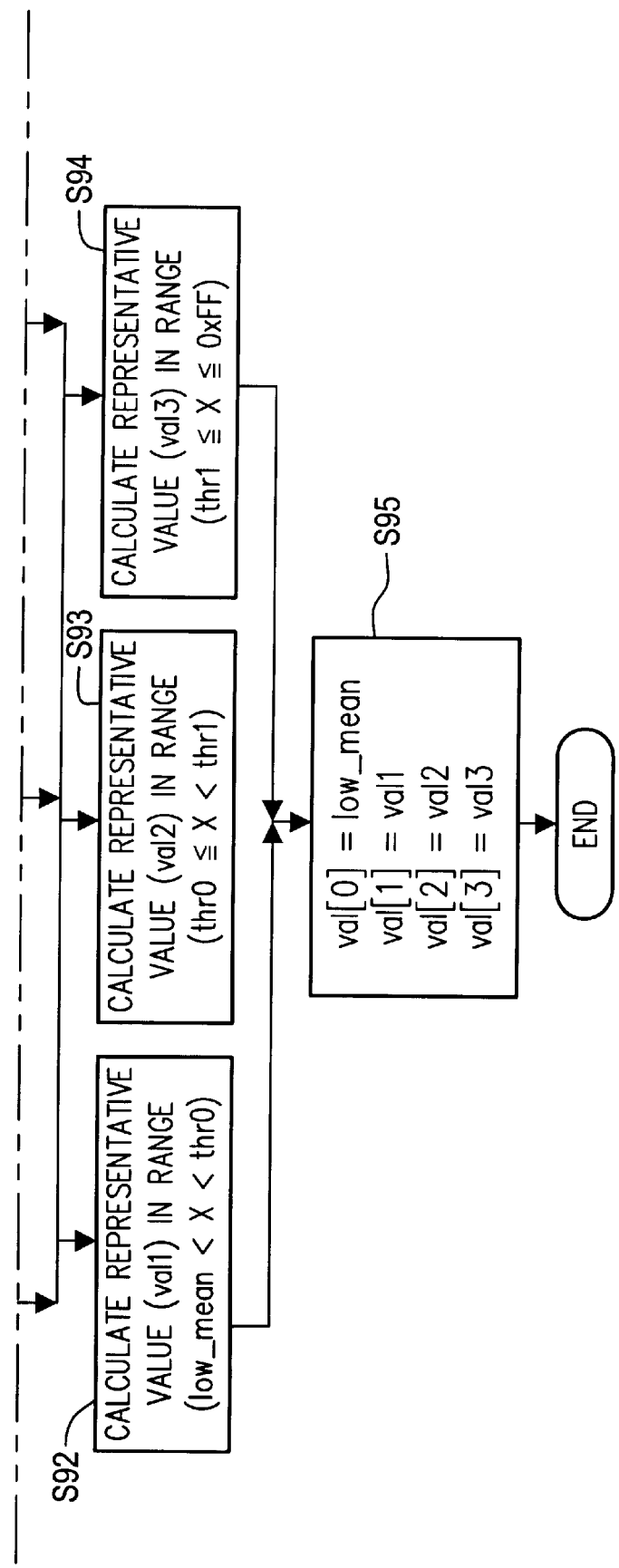

FIG. 12 is a flowchart of the third representative value determination process.

First, in the histogram distribution range in the pixel value X range of the low-density area distribution mean low_mean to 255 (=0xFF), the value repva11 representing the range is determined.

More specifically, the pixel values in the block are referenced and the value repva11 representing the range is calculated in the pixel value X range of the low-density area distribution mean low_mean to 255 (=0xFF), namely, $$low\_mean < X \leq 0xFF$$

at step S81. Mean value, center value, most frequently occurring value, etc., of the pixel values in the range is used to calculate the representative value repva11.

Next, the maximum value max1 and the minimum value min1 are found in the pixel value X range of low_mean to 255 (=0xFF) at step S82.

Subsequently, the absolute value of the difference between the representative value repva11 and the maximum value max1 and that between the value repva11 and the minimum value min1, r1 and r2, are found according to the following expressions at step S82:

$$r1 = |min1 - repva11|$$

$$r2 = |repva11 - max1|$$

By the way, if the absolute value r1 of the difference between the minimum value min1 in the range and the representative value repva11 in the range is small, it can be judged that the pixel value histogram distribution in the pixel value range is not a form close to a normal distribution and is a distribution leaning in the maximum value max direction.

Likewise, if the absolute value r2 of the difference between the maximum value max1 in the range and the representative value repva11 in the range is small, it can be judged that the pixel value histogram distribution in the pixel value range is not a form close to a normal distribution and is a distribution leaning in the minimum value min direction.

If the absolute values of the differences, r1 and r2, are both large, it can be judged that the pixel value histogram distribution in the range is a comparatively less leaning form close to a normal distribution or a flat distribution.

Thus, the histogram distribution state in the range can be classified by comparing the difference absolute values r1 and r2 with predetermined threshold values th3 and th4.

Then, first whether or not the difference absolute value r1 is equal to or less than the threshold value th3, namely, $$r1 \leq th3$$

is determined at step S84.

If it is determined at step S84 that the difference absolute value r1 is equal to or less than the threshold value th3, namely, $$r1 \leq th3$$

(Yes at step S84), it can be judged that the histogram distribution in the pixel value range is a distribution form leaning in the minimum value min1 direction.

Thus, to divide the range into three parts, in the pixel value X range of repva11 to the high-density area distribution mean up_mean, namely, $$repva11 < X \leq up\_mean$$

value repva12 representing the range is calculated at step S90.

First division range value thr0=repva11 and second division range value thr1=repva12 at step S91.

Next, block representative value VAL[0]=VAL1 is calculated in the pixel value X range of the low-density area distribution mean low_mean to the first division range value thr0=repva11 at step S92. To calculate the block representative value VAL[0]=VAL1, mean value, center value, etc., of the pixel values in the range is used.

Likewise, block representative value VAL[1]=VAL2 is calculated in the pixel value X range of the first division range value thr0=repva11 to the second division range value thr1=repva12 at step S93. To calculate the block representative value VAL[1]=VAL2, mean value, center value, etc., of the pixel values in the range is used.

Likewise, block representative value VAL[2]=VAL3 is calculated in the pixel value X range of the second division range value thr1=repva12 to 255 (=00xFF) at step S94. To calculate the block representative value VAL[2]=VAL3, mean value, center value, etc., of the pixel values in the range is used.

Resultantly, the four block representative values VAL[0] to VAL[3] are determined at step S95 as follows:

VAL[0]=low_mean
VAL[1]=VAL1
VAL[2]=VAL2
VAL[3]=VAL3

If it is determined at step S84 that the difference absolute value r1 is greater than the threshold value th3, namely, $$r1 > th3$$

(No at step S84), control goes to step S85 at which whether or not the difference absolute value r2 is equal to or less than the threshold value th4, namely, $$r2 \leq th4$$

is determined.

If it is determined at step S85 that the difference absolute value r2 is equal to or less than the threshold value th4, namely, $$r2 \leq th4$$

(Yes at step S85), it can be judged that the histogram distribution in the pixel value range is a distribution form leaning in the maximum value max1 direction.

Thus, to divide the range into three parts, in the pixel value X range of 0 (=0x00) to the value repva11, namely, $$0x00 < X \leq repva11$$

the value repva12 representing the range is calculated at step S88.

First division range value thr0=repva12 and second division range value thr1=repva11 at step S89.

Next, block representative value VAL[0]=VAL1 is calculated in the pixel value X range of 0 (=00x0) to the first division range value thr0=repva12 at step S92. To calculate the block representative value VAL[0]=VAL1, mean value, center value, etc., of the pixel values in the range is used.

Likewise, block representative value VAL[1]=VAL2 is calculated in the pixel value X range of the first division range value thr0=repva12 to the second division range value thr1=repva11 at step S93. To calculate the block representative value VAL[1]=VAL2, mean value, center value, etc., of the pixel values in the range is used.

Likewise, block representative value VAL[2]=VAL3 is calculated in the pixel value X range of the second division range value thr1=repva11 to the high-density area distribution mean up_mean at step S94. To calculate the block representative value VAL[2]=VAL3, mean value, center value, etc., of the pixel values in the range is used.

Resultantly, the four block representative values VAL[0] to VAL[3] are determined at step S95 as follows:

VAL[0]=low_mean
VAL[1]=VAL1
VAL[2]=VAL2
VAL[3]=VAL3

If it is determined at step S85 that the difference absolute value r2 is greater than the threshold value th4, namely, $$r2 > th4$$

(No at step S85), it can be judged that the histogram distribution in the pixel value range less leans in the minimum min1 or maximum max1 direction and is a form comparatively close to a normal distribution or a flat distribution.

Thus, to divide the range into three parts, various methods are possible; in the embodiment, first division range value thr0=(min1+repva11×2)/3 second division range value thr1=(repva12×2+max1)/3 are found at step S87 and these division range values thr0 and thr1 are used to divide the range into three parts.

Block representative value VAL[0]=VAL1 is calculated in the pixel value X range of 0 (=0x00) to the first division range value thr0=(min1+repva11 X 2)/3, namely, $$0x00 < X \leq (min1 + repva11 \times 2)/3$$

at step S92. To calculate the block representative value VAL[0]=VAL1, mean value, center value, etc., of the pixel values in the range is used.

Likewise, block representative value VAL[1] VAL2 is calculated in the pixel value X range of the first division range value thr0=(min1+repva11×2)/3 to the second division range value thr1=(repva12×2+max1)/3 at step S93. To calculate the block representative value VAL[1]=VAL2, mean value, center value, etc., of the pixel values in the range is used.

Likewise, block representative value VAL[2]=VAL3 is calculated in the pixel value X range of the second division range value thr1=(repva12×2+max1)/3 to the high-density area distribution mean up_mean at step S94. To calculate the block representative value VAL[2]=VAL3, mean value, center value, etc., of the pixel values in the range is used.

Resultantly, the four block representative values VAL[0] to VAL[3] are determined at step S95 as follows:

VAL[0]=low_mean
VAL[1]=VAL1
VAL[2]=VAL2
VAL[3]=VAL3

If it is determined at step S42 that the absolute value s2 is greater than the second threshold value th2 (No at step S42), control goes to step 44 for performing a fourth representative value determination process (indicated as representative value determination process (4) in the figure).

The fourth representative value determination process is a representative value determination process executed when the histogram distribution of the pixel values in the block image BG does not contain any discrete distribution portion.

Therefore, four block representative values are calculated from the whole histogram distribution of the pixel values in the block image BG.

First, one value representing all the pixel value range of 0 (=0x00) to 255 (=0xFF) is determined.

Since the minimum value min and the maximum value max in the range are found at the preceding stage, the absolute value of the difference between the found value representing all the pixel value range and the minimum value min and that between the value and the maximum value max are found as r1 and r2 respectively.

All the pixel value range is divided into four parts while the histogram distribution state is considered according to the difference absolute values r1 and r2.

A value representing each division range is determined and the four representative values are used as block representative values.

Figure 13A:
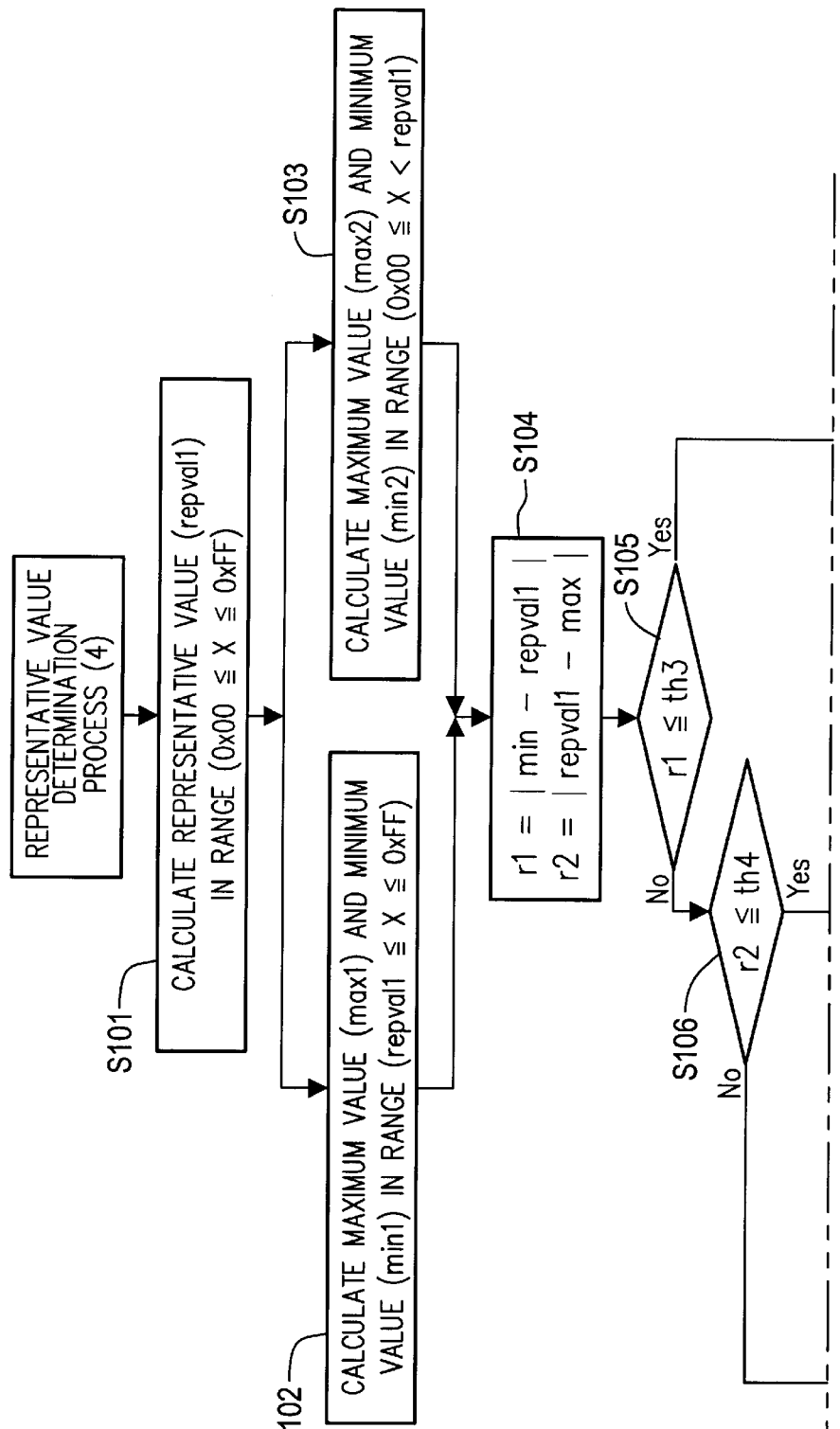
FIG. 13 is a flowchart of a fourth representative value determination process.
Figure 13B:
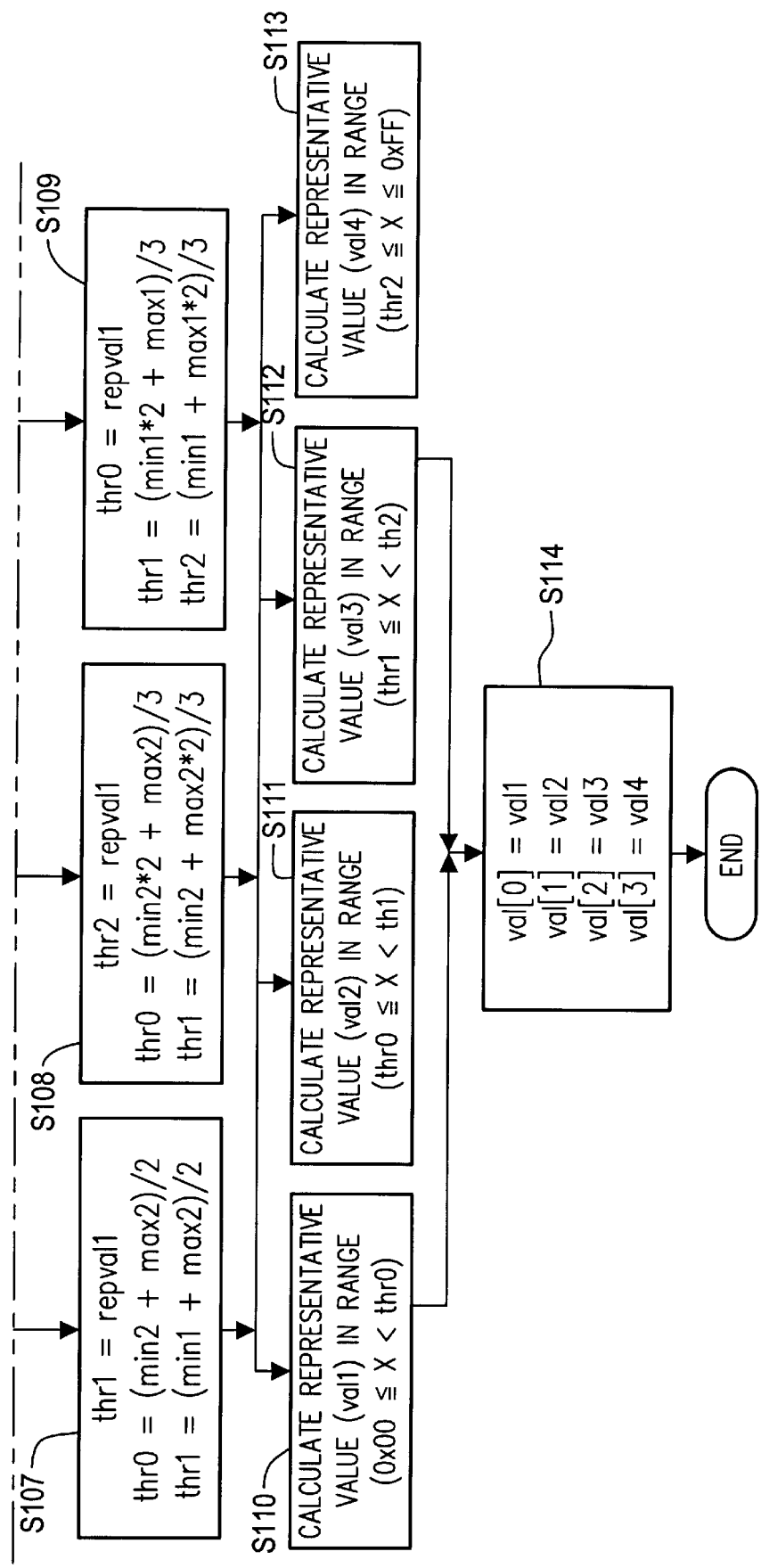

FIG. 13 is a flowchart of the fourth representative value determination process.

First, in the histogram distribution range in the pixel value X range of 0 (=00x00) to 255 (=0xFF), the value repval1 representing the range is determined.

More specifically, the pixel values in the block are referenced and the value repval1 representing the range is calculated in the pixel value X range of 0 (=00x00) to 255 (=0xFF), namely, $$00x00 < X \leq 0xFF$$

at step S101. Mean value, center value, most frequently occurring value, etc., of the pixel values in the range is used to calculate the representative value repval1.

Next, maximum value max1 and minimum value min1 are found in the pixel value X range of repval1 to 255 (=0xFF) at step S102.

Further, maximum value max2 and minimum value min2 are found in the pixel value X range of 0 (=00x00) to repval1 at step S103.

Subsequently, the absolute value of the difference between the representative value repval1 and the maximum value max and that between the value repval1 and the minimum value min, r1 and r2, are found according to the following expressions at step S104:

$$r1 = |min - repval1|$$

$$r2 = |repval1 - max1|$$

Next, whether or not the difference absolute value r1 is equal to or less than the threshold value th3, namely, $$r1 \leq th3$$

is determined at step S105.

If it is determined at step S105 that the difference absolute value r1 is equal to or less than the threshold value th3, namely, $$r1 \leq th3$$

(Yes at step S105), it indicates that the difference between the minimum value min and the representative value repval1 is small and it can be judged that the histogram distribution is a distribution form leaning in the minimum value min1 direction.

Thus, to divide the range into four parts, various dividing methods are possible; in the embodiment, the range is divided into four parts by using three division range values thr0, thr1, and thr2 found as follows:

The representative value repval1 is applied intact to the first division range value thr0 closest to the minimum value min. The maximum value max1 and the minimum value min1 in the pixel value range of repval1 to 255 (=0xFF) are referenced and a value internally dividing the maximum value max1 and the minimum value min1 1:2 is applied to the second division range value thr1. The maximum value max1 and the minimum value min1 in the pixel value range of repval1 to 255 (=0xFF) are referenced and a value internally dividing the maximum value max1 and the minimum value min1 2:1 is applied to the third division range value thr2.

That is, $$thr0 = repval1$$

$$thr1 = (min1 \times 2 + max1)/3$$

$$thr2 = (min1 + max1 \times 2)/3$$

are calculated at step S109.

Next, block representative value VAL[0]=VAL1 is calculated in the pixel value X range of 0 (0x00) to the first division range value thr0=repval1 at step S110. To calculate the block representative value VAL[0]=VAL1, mean value, center value, etc., of the pixel values in the range is used.

Likewise, block representative value VAL[1]=VAL2 is calculated in the pixel value X range of the first division range value thr0=repval1 to the second division range value thr1=(min1×2+max1)/3 at step S111. To calculate the block representative value VAL[1]=VAL2, mean value, center value, etc., of the pixel values in the range is used.

Likewise, block representative value VAL[2]=VAL3 is calculated in the pixel value X range of the second division range value thr1=(min1×2+max1)/3 to the third division range value thr2=(min1+max1×2)/3 at step S112. To calculate the block representative value VAL[2]=VAL3, mean value, center value, etc., of the pixel values in the range is used.

Likewise, block representative value VAL[3]=VAL4 is calculated in the pixel value X range of the third division range value thr2=(min1+max1×2)/3 to 255 (=0xFF) at step S113. To calculate the block representative value VAL[3]=VAL4, mean value, center value, etc., of the pixel values in the range is used.

Resultantly, the four block representative values VAL[0] to VAL[3] are determined at step S114 as follows:

VAL[0]=VAL1

VAL[1]=VAL2

VAL[2]=VAL3

VAL[3]=VAL4

If it is determined at step S105 that the difference absolute value r1 is greater than the threshold value th3, namely, $$r1 > th3$$

(No at step S105), control goes to step S106 at which whether or not the difference absolute value r2 is equal to or less than the threshold value th4, namely, $$r2 \leq th4$$

is determined.

If it is determined at step S106 th at the difference absolute value r2 is equal to or less than the threshold value th4, namely, $$r2 \leq th4$$

(Yes at step S106), it indicates that the difference between the maximum value max and the representative value is small and it can be judged that the histogram distribution in the pixel value range is a distribution form leaning in the maximum value max1 direction.

Thus, to divide the range into four parts, various dividing methods are possible; in the embodiment, the range is divided into four parts by using three division range values thr0, thr1, and thr2 found as follows:

The representative value repval1 is applied intact to the third division range value thr2 closest to the maximum value max. The maximum value max2 and the minimum value min2 in the pixel value range of 0 (=0x00) to the representative value repval1 are referenced and a value internally dividing the minimum value min2 and the maximum value max2 1:2 is applied to the first division range value thr0. The maximum value max2 and the minimum value min2 in the pixel value range of 0 (=0x00) to the representative value repval1 are referenced and a value internally dividing the minimum value min2 and the maximum value max2 2:1 is applied to the second division range value thr1.

That is, $$thr0=(min2\times2+max2)/3$$

$$thr1=(min2+max2\times2)/3$$

$$thr2=repval1$$

are calculated at step S108.

Next, block representative value VAL[0]=VAL1 is calculated in the pixel value X range of 0 (0x00) to the first division range value thr0=(min2×2+max2)/3 at step S110. To calculate the block representative value VAL[0]=VAL1, mean value, center value, etc., of the pixel values in the range is used.

Likewise, block representative value VAL[1]=VAL2 is calculated in the pixel value X range of the first division range value thr0=(min2×2+max2)/3 to the second division range value thr1=(min2+max2×2)/3 at step S111. To calculate the block representative value VAL[1]=VAL2, mean value, center value, etc., of the pixel values in the range is used.

Likewise, block representative value VAL[2]=VAL3 is calculated in the pixel value X range of the second division range value thr1=(min2+max2×2)/3 to the third division range value thr2=repval1 at step S112. To calculate the block representative value VAL[2]=VAL3, mean value, center value, etc., of the pixel values in the range is used.

Likewise, block representative value VAL[3]=VAL4 is calculated in the pixel value X range of the third division range value thr2=repval1 to 255 (=0xFF) at step S113. To calculate the block representative value VAL[3]=VAL4, mean value, center value, etc., of the pixel values in the range is used.

Resultantly, the four block representative values VAL[0] to VAL[3] are determined at step S114 as follows:

VAL[0]=VAL1
VAL[1]=VAL2
VAL[2]=VAL3
VAL[3]=VAL4
VAL[3]=VAL3

If it is determined at step S106 that the difference absolute value r2 is greater than the threshold value th4, namely, $$r2>th4$$

(No at step S106), it can be judged that the histogram distribution in the pixel value range less leans in the minimum min1 or maximum max1 direction and is a form comparatively close to a normal distribution or a flat distribution.

Thus, to divide the range into four parts, various methods are possible; in the embodiment, first division range value thr0=(min2+max2)/2
second division range value thr1=repval1
third division range value thr2=(min1+max1)/2 are found at step S107 and these division range values thr0, thr1, and thr2 are used to divide the range into four parts.

Next, block representative value VAL[0]=VAL1 is calculated in the pixel value X range of 0 (=0x00) to the first division range value thr0=(min2+max2)/2 at step S110. To calculate the block representative value VAL[0]=VAL1, mean value, center value, etc., of the pixel values in the range is used.

Likewise, block representative value VAL[1]=VAL2 is calculated in the pixel value X range of the first division range value thr0=(min2+max2)/2 to the second division range value thr1=repval1 at step S111. To calculate the block representative value VAL[1]=VAL2, mean value, center value, etc., of the pixel values in the range is used.

Likewise, block representative value VAL[2]=VAL3 is calculated in the pixel value X range of the second division range value thr1=repval1 to the third division range value thr2 (min1+max1)/2 at step S112. To calculate the block representative value VAL[2]=VAL3, mean value, center value, etc., of the pixel values in the range is used.

Likewise, block representative value VAL[3]=VAL4 is calculated in the pixel value X range of the third division range value thr2=(min1+max1)/2 to 255 (0xFF) at step S113. To calculate the block representative value VAL[3]=VAL4, mean value, center value, etc., of the pixel values in the range is used.

Resultantly, the four block representative values VAL[0] to VAL[3] are determined at step S114 as follows:

VAL[0]=VAL1
VAL[1]=VAL2
VAL[2]=VAL3
VAL[3]=VAL4
VAL[3]=VAL3

When these four block representative values VAL[0] to VAL[3] are provided, the block representative value having the closest value is assigned (mapped) to each pixel and the processing is terminated. The code data format is similar to that in the first embodiment.

As described above, according to the coding processing technique of the second embodiment, the number of processing stages is fixed, thus the processing time can be guaranteed unlike the first embodiment in which processing makes a loop.

Thus, the second embodiment is more appropriate for hardware processing.

According to the second embodiment, the values indicating the pixel value state in the block image for each block image are calculated, the pixel value histogram distribution state in the block image is classified into the four categories from the correlation among the values, and the block representative value calculation method responsive to the distribution state is applied, whereby the coding technique capable of minimizing quality degradation of a decomposed image and providing a high-quality image (QBTC coding technique) can be accomplished even for image data containing mixed CG image and scanned image areas.

<Third Embodiment>

Next, a third embodiment of the invention will be discussed.

The description to follow centers around a block truncation coding circuit for a QBTC coding technique. Parts identical with those in the first embodiment are denoted by the same reference numerals in the second embodiment and will not be discussed again in detail.

In the description to follow, the block size of a block image BG is 8×8 pixels and the number of block representative values N=4.

In the QBTC coding technique in the third embodiment, maximum value max, minimum value min, and center value main are calculated for each block image and the histogram distribution state is classified into three categories based on the correlation between the difference value between the center value main and the maximum value max and that between the center value main and the minimum value min, then block representative values are calculated in response to each histogram distribution state.

Processing after block representative value determination, such as mapping of pixel values in each block image BG to the block representative values, is similar to that in the first embodiment.

Figure 14B:
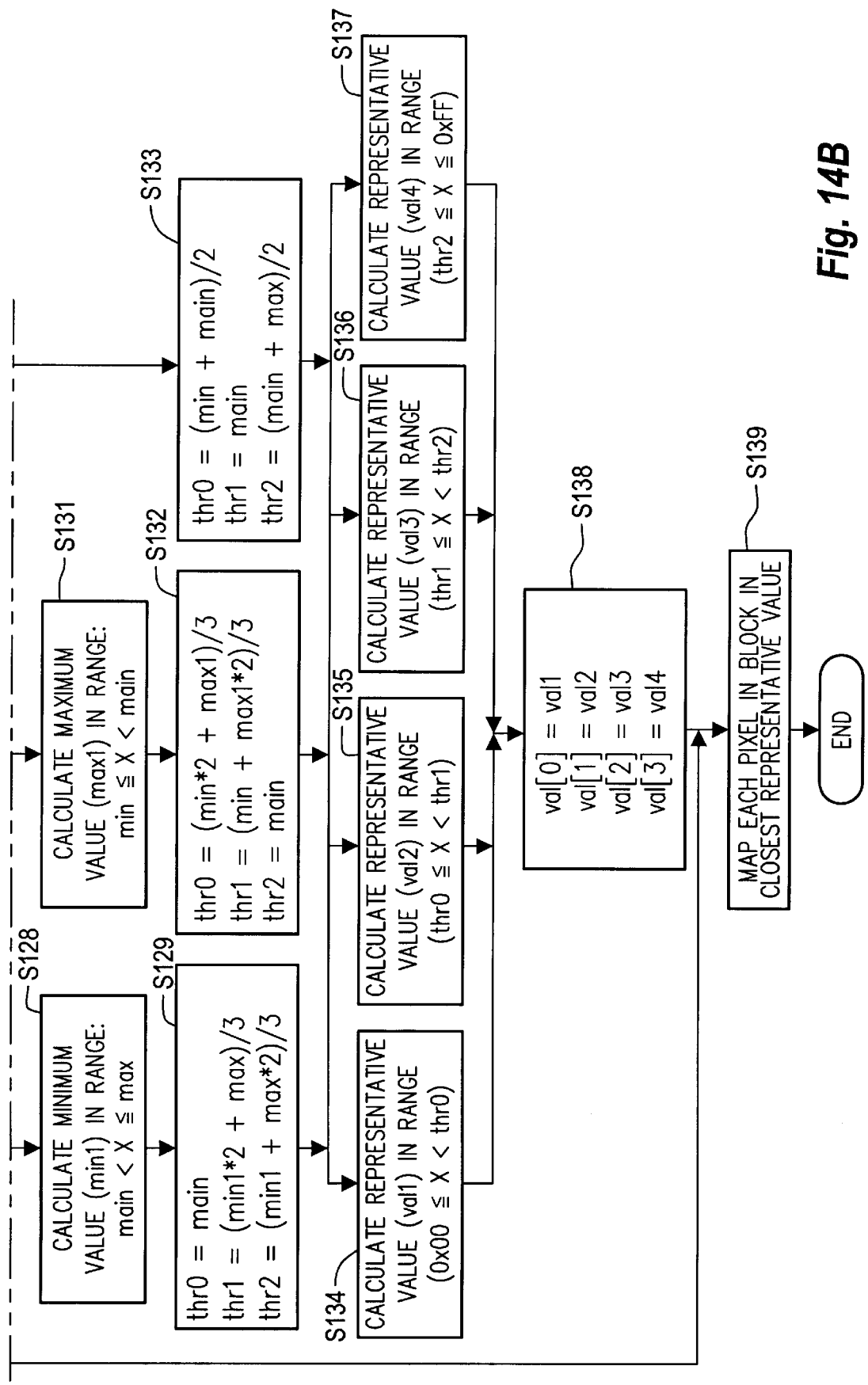
FIG. 14 is a coding processing flowchart in a third embodiment of the invention.

In the third embodiment, the histogram distribution state is classified into the following three categories:

(1) Distribution leaning in minimum value min direction;
(2) Distribution leaning in maximum value max direction; and
(3) Distribution leaning in the vicinity of center FIG. 14 is a processing flowchart of the block truncation coding technique in the third embodiment.

A block truncation coding circuit (QBTC coding circuit) 7 receives a block image BG having a size of 8×8 through the first selector 5 from the raster block conversion circuit 3 and checks all pixel values in the block image BG.

How many types of pixel values exist in the block image BG is calculated, whereby the number of levels in the block image BG, CN, is calculated at step S121.

Next, the calculated number of levels CN is compared with the number of block representative values N=4 at step S122.

If it is determined at step S122 that the number of levels CN is equal to or less than the number of block representative values N=4 (Yes at step S122), namely, $$CN \leq N=4$$

the block representative values of the block are the CN types of pixel values VAL0–VALCN−1 and pixel value VALX (X: 0 to CN−1) having the closest value is assigned (mapped) to each pixel at step S139, then the processing is terminated.

If it is determined at step S122 that the number of levels CN is greater than the number of block representative values N (No at step S122), namely, $$CN>N$$

the pixel values in the block image BG are referenced and the minimum value min, the maximum value max, and the center value main are calculated at steps S123–S125:

(1) Calculate minimum value min at step S123
The minimum value min is the minimum value of all pixel values in the block image BG.
(2) Calculate maximum value max at step S124
The maximum value max is the maximum value of all pixel values in the block image BG.
(3) Calculate center value main at step S125
A pixel value histogram distribution in the block image is prepared and the center value main is a value indicating a frequency of a half all frequencies.

Next, the histogram distribution state is classified into the three categories from the correlation among the minimum value min, the maximum value max, and the center value main.

More particularly, absolute value L1 of the difference between the center value main and the minimum value min and absolute value L2 of the difference between the center value main and the maximum value max are found according to the following expressions at step S126.

$$L1=|\text{main}-\text{min}|$$

$$L2=|\text{main}-\text{max}|$$

In this case, if the absolute value L1 is small, it can be judged that the histogram distribution leans in the minimum value direction and if the absolute value L2 is small, it can be judged that the histogram distribution leans in the maximum value direction.

Thus, the absolute values L1 and L2 are compared with predetermined threshold values P1 and P2 and if the absolute value L1 is smaller than the threshold value P1, it can be judged that the histogram distribution leans in the minimum value min direction. If the absolute value L2 is smaller than the threshold value P2, it can be judged that the histogram distribution leans in the maximum value max direction. Further, if both the absolute values L1 and L2 are larger than the threshold values P1 and P2, it is judged that the histogram distribution is a distribution form not leaning in the maximum value max direction or the minimum value min direction, such as a form close to a normal distribution or a flat form.

Optimum block representative values are calculated in response to the three histogram distribution state categories.

Next, whether or not the difference absolute value L1 is less than the threshold value P1, namely, $$L1<P1$$

is determined at step S127.

If it is determined at step S127 that the difference absolute value L1 is less than the threshold value P1, namely, $$L1<P1$$

(Yes at step S127), it indicates that the difference between the minimum value min and the center value main is small and it can be judged that the histogram distribution is a distribution form leaning in the minimum value min1 direction.

Next, the minimum value min1 is found in the pixel value X range of the center value main to the maximum value max at step S128.

To divide the range into four parts, various dividing methods are possible; in the embodiment, the range is divided into four parts by using three division range values thr0, thr1, and thr2 found as follows:

The center value main is applied intact to the first division range value thr0 closest to the minimum value min. The minimum value min1 and the maximum value max in the pixel value range of the minimum value min1 and the maximum value max are referenced and a value internally dividing the minimum value min1 and the maximum value max 1:2 is applied to the second division range value thr1. The minimum value min1 and the maximum value max in the pixel value range of the minimum value min1 and the maximum value max are referenced and a value internally dividing the minimum value min1 and the maximum value max 2:1 is applied to the third division range value thr2.

That is, $$thr0=\text{main}$$

$$thr1=(\text{min1}\times 2+\text{max})/3$$

$$thr2=(\text{min1}+\text{max}\times 2)/3$$

are calculated at step S128.

Next, block representative value VAL[0]=VAL1 is calculated in the pixel value X range of 0 (0x00) to the first division range value thr0=main at step S134. To calculate the block representative value VAL[0]=VAL1, mean value, center value, most frequently occurring value, etc., of the pixel values in the range is used.

Likewise, block representative value VAL[1]=VAL2 is calculated in the pixel value X range of the first division range value thr0=main to the second division range value thr1=(min1×2+max)/3 at step S135. To calculate the block representative value VAL[1]=VAL2, mean-value, center value, etc., of the pixel values in the range is used.

Likewise, block representative value VAL[2]=VAL3 is calculated in the pixel value X range of the second division range value thr1=(min1×2+max)/3 to the third division range value thr2=(min1+max×2)/3 at step S136. To calculate the block representative value VAL[2]=VAL3, mean value, center value, etc., of the pixel values in the range is used.

Likewise, block representative value VAL[3]=VAL4 is calculated in the pixel value X range of the third division range value thr2=(min1+max×2)/3 to 255 (=0xFF) at step S137. To calculate the block representative value VAL[3]=VAL4, mean value, center value, most frequently occurring value, etc., of the pixel values in the range is used.

Resultantly, the four block representative values VAL[0] to VAL[3] are determined at step S138as follows:

VAL[0]=VAL1
VAL[1]=VAL2
VAL[2]=VAL3
VAL[3]=VAL4

When these four block representative values VAL[0] to VAL[3] are provided, the block representative value having the closest value is assigned (mapped) to each pixel at step S139 and the processing is terminated. The code data format is similar to that in the first embodiment.

If it is determined at step S127 that the difference absolute value L1 is equal to or greater than the threshold value P1, namely, $L1 \geq P1$ (No at step S127), control goes to step S130 at which whether or not the difference absolute value L2 is less than the threshold value P2, namely, $L2 < P2$ is determined.

If it is determined at step S130 that the difference absolute value L2 is less than the threshold value P2 namely, $L2 < P2$ (Yes at step S130), it indicates that the difference between the maximum value max and the center value main is small and it can be judged that the histogram distribution in the pixel value range is a distribution form leaning in the maximum value max direction.

Next, the maximum value max1 is found in the pixel value X range of the minimum value min to the center value main at step S131.

Subsequently, to divide the range into four parts, various dividing methods are possible; in the embodiment, the range is divided into four parts by using three division range values thr0, thr1, and thr2 found as follows:

The center value main is applied intact to the third division range value thr2 closest to the maximum value max. The minimum value min and the maximum value max1 in the pixel value range of the minimum Value min to the center value main are referenced and a value internally dividing the minimum value min and the maximum value max1 1:2 is applied to the first division range value thr0. The minimum value min and the maximum value max1 in the pixel value range of the minimum value min to the center value main are referenced and a value internally dividing the minimum value min and the maximum value max1 2:1 is applied to the second division range value thr1.

That is, $thr0=(min \times 2+max1)/3$ $thr1=(min+max1 \times 2)/3$ $thr2=main$ are calculated at step S132.

Next, block representative value VAL[0]=VAL1 is calculated in the pixel value X range of 0 (0x00) to the first division range value thr0=(min×2+max1)/3 at step S134. To calculate the block representative value VAL[0]=VAL1, mean value, center value, most frequently occurring value, etc., of the pixel values in the range is used.

Likewise, block representative value VAL[1]=VAL2 is calculated in the pixel value X range of the first division range value thr0=(min×2+max1)/3 to the second division range value thr1=(min+max1×2)/3 at step S135. To calculate the block representative value VAL[1]=VAL2, mean value, center value, etc., of the pixel values in the range is used.

Likewise, block representative value VAL[2]=VAL3 is calculated in the pixel value X range of the second division range value thr1=(min+max1×2)/3 to the third division range value thr2=main at step S136. To calculate the block representative value VAL[2]=VAL3, mean value, center value, etc., of the pixel values in the range is used.

Likewise, block representative value VAL[3]=VAL4 is calculated in the pixel value X range of the third division range value thr2=main to 255 (=0xFF) at step S137. To calculate the block representative value VAL[3]=VAL4, mean value, center value, etc., of the pixel values in the range is used.

Resultantly, the four block representative values VAL[0] to VAL[3] are determined at step S138 as follows:

VAL[0]=VAL1
VAL[1]=VAL2
VAL[2]=VAL3
VAL[3]=VAL4
VAL[3]=VAL3

When these four block representative values VAL[0] to VAL[3] are provided, the block representative value having the closest value is assigned (mapped) to each pixel at step S139 and the processing is terminated. The code data format is similar to that in the first embodiment.

If it is determined at step S130 that the difference absolute value L2 is equal to or greater than the threshold value P2, namely, $L2 \leq P2$ (No at step S130), it can be judged that the histogram distribution in the pixel value range less leans in the minimum min1 or maximum max1 direction and is a form comparatively close to a normal distribution or a flat distribution.

Thus, to divide the range into four parts, various methods are possible; in the embodiment, first division range value thr0=(min+main)/2 second division range value thr1=main third division range value thr2=(main+max)/2 are found at step S133 and these division range values thr0, thr1, and thr2 are used to divide the range into four parts.

Next, block representative value VAL[0]=VAL1 is calculated in the pixel value X range of 0 (=0x00) to the first division range value thr0=(min+main)/2 at step S134. To calculate the block representative value VAL[0]=VAL1, mean value, center value, etc., of the pixel values in the range is used.

Likewise, block representative value VAL[1]=VAL2 is calculated in the pixel value X range of the first division range value thr0=(min+main)/2 to the second division range value thr1=main at step S135. To calculate the block representative value VAL[1]=VAL2, mean value, center value, most frequently occurring value, etc., of the pixel values in the range is used.

Likewise, block representative value VAL[2]=VAL3 is calculated in the pixel value X range of the second division range value thr1=main to the third division range value thr2=(main+max)/2 at step S134. To calculate the block representative value VAL[2]=VAL3, mean value, center value, etc., of the pixel values in the range is used.

Likewise, block representative value VAL[3]=VAL4 is calculated in the pixel value X range of the third division range value thr2=(main+max)/2 to 255 (0xFF) at step S137. To calculate the block representative value VAL[3]=VAL4, mean value, center value, etc., of the pixel values in the range is used.

Resultantly, the four block representative values VAL[0] to VAL[3] are determined at step S138 as follows:

VAL[0]=VAL1
VAL[1]=VAL2
VAL[2]=VAL3
VAL[3]=VAL4
VAL[3]=VAL3

When these four block representative values VAL[1] to VAL[4] are provided, the block representative value having the closest value is assigned (mapped) to each pixel at step S139 and the processing is terminated. The code data format is similar to that in the first embodiment.

As described above, according to the coding processing technique of the third embodiment, processing is simple as compared with the first and second embodiments, so that the coding processing technique is fitted to high-speed processing and is also put into hardware appropriately.

In the coding technique of the third embodiment, the values indicating the pixel value state in the block for each block image are calculated, the pixel value histogram distribution state in the block image is classified into the four categories from the correlation among the values, and the block representative values responsive to the distribution state are calculated, thus the coding technique capable of minimizing quality degradation of a decomposed image and providing a high-quality image (QBTC coding technique) can be accomplished even for image data containing mixed CG image and scanned image areas.

According to the invention of aspect 1, the block representative values are set adaptively based on the feature amount concerning the distribution state of the area in the proximity of the distribution range end in the detected frequency distribution of the input image data. Thus, if block truncation coding is executed based on an input image having mixed CG image and scanned image areas, efficient coding can be performed and a high-quality decomposed image can be provided.

According to the invention of aspect 4, the block representative values are set adaptively-based on the feature amount concerning the distribution state of the prepared histogram of the input image data. Thus, if block truncation coding is executed based on an input image having mixed CG image and scanned image areas, efficient coding can be performed and a high-quality decomposed image can be provided.

Further, when the histogram is divided into image data groups, the image data groups can be again divided to provide a high-quality decomposed image, thus efficient coding can be performed and a high-quality decomposed image can be provided more reliably.

According to the invention of aspect 7, when the block representative values are set adaptively based on the feature amount concerning the distribution state of the prepared histogram of the input image data, a threshold value for again dividing the provided image data groups is calculated based on the calculated feature amount. Thus, if block truncation coding is executed based on an input image having mixed CG image and scanned image areas, efficient coding can be performed and a high-quality decomposed image can be provided more reliably.

According to the invention of aspect 9, when the block representative values are set, the number of image data groups M is compared with the preset number of block representative values N. If the number of image data groups M is equal to or less than the number of block representative values N, M block representative values are set. If the number of image data groups M exceeds the number of block representative values, N block representative values are set. Thus, fruitless processing does not occur and coding processing can be speeded up.

According to the invention of aspect 10, when the block representative values are set, whether or not they are to be calculated using the histogram is determined based on the feature amount of the histogram, thus fruitless calculation processing is not performed and the most efficient block representative values can be provided.

According to the invention of aspect 16, when the block representative values are set, the number of image data groups M is compared with the preset number of block representative values N. If the number of image data groups M is equal to or less than the number of block representative values N, M block representative values are set. If the number of image data groups M exceeds the number of block representative values, N block representative values are set. Thus, fruitless processing does not occur and coding processing can be speeded up.

According to the invention of aspect 17, the block representative values are set adaptively based on the feature amount concerning the distribution state of the prepared histogram of the input image data. Thus, if block truncation coding is executed based on an input image having mixed CG image and scanned image areas, efficient coding can be performed and a high-quality decomposed image can be provided.

Further, when the histogram is divided into image data groups, the image data groups can be again divided to provide a high-quality decomposed image, thus efficient coding can be performed and a high-quality decomposed image can be provided more reliably.

According to the invention of aspect 18, when the block representative values are set, whether or not they are to be calculated using the histogram is determined based on the feature amount of the histogram, thus fruitless calculation processing is not performed and the most efficient block representative values can be provided.

What is claimed is:

1. An image processing system for assigning any one of block representative values to approximate image data to the image data corresponding to each of pixels making up an input image and then coding the image data in units of block images made up of the pixels, said image processing system comprising:

frequency distribution detection means for detecting a frequency distribution of image data input for each of the block images;

feature amount calculation means for calculating a feature amount concerning a distribution state of an area in the proximity of a distribution range end in the detected frequency distribution;

determination means for determining whether or not the block representative values are to be set from the frequency distribution of the area in the proximity of the distribution range end based on the calculated feature amount; and representative value setting means for setting the block representative values based on the detected frequency distribution in response to the determination result of said determination means.

2. The image processing system of claim 1, wherein said feature amount calculation means calculates an index indicating that the frequency distribution in the area in the proximity of the distribution range end leans to the frequency distribution range end side detected by said frequency distribution detection means as the feature amount.

3. The image processing system of claim 1, wherein said representative value setting means sets N block representative values (where N is a n integer of two or more) and comprises:

a first block representative value setting section for setting n block representative values (n=1, 2) based on the frequency distribution in the proximity of the distribution range end if said determination means determines that the block representative values are to be set from the frequency distribution in the proximity of the distribution range end; and a second block representative value setting section, if said first block representative value setting section sets the n block representative values, for setting (N−n) block representative values based on the frequency distribution of the image data to which the block representative values set by said first block representative value setting section are not assigned in the frequency distribution detected by said frequency distribution detection means.

4. The image processing system of claim 1 further comprising:

means for relating the image data to the block representative values; and means for coding the image data based on the related block representative values.

5. An image processing system for assigning any one of block representative values to approximate image data to the image data corresponding to each of pixels making up an input image and then coding the image data in units of block images made up of the pixels, said image processing system comprising:

histogram preparation means for preparing a histogram of image data input for each of the block images;

image data dividing means for dividing the image data into image data groups based on the prepared histogram;

feature amount calculation means for calculating a feature amount concerning a distribution state of the histogram corresponding to each of the image data groups;

determination means for determining whether or not the block representative value is to be calculated using the histogram corresponding to each of the image data groups provided by said image data dividing means based on the calculated feature amount;

redividing control means for causing said image data dividing means to again divide the image data, if the block representative value is not calculated using the histogram corresponding to each of the image data groups provided by said image data dividing means in response to the determination result of said determination means; and block representative value calculation means for calculating the block representative value in response to the determination result of said determination means.

6. The image processing system of claim 5, wherein the image data group in the proximity of the distribution range end of the prepared histogram is separated and divided.

7. The image processing system of claim 6, wherein the feature amount of the image data group in the proximity of the distribution range end is calculated.

8. The image processing system of claim 5 further comprising:

means for relating the image data to the block representative values; and means for coding the image data based on the related block representative values.

9. An image processing system for assigning any one of block representative values to approximate image data to the image data corresponding to each of pixels making up an input image and then coding the image data in units of block images made up of the pixels, said image processing system comprising:

histogram preparation means for preparing a histogram of image data input for each of the block images based on a predetermined condition;

image data dividing means for dividing the image data into image data groups based on the prepared histogram;

feature amount calculation means for calculating a feature amount concerning a distribution state of the histogram corresponding to each of the image data groups;

threshold value calculation means for calculating a threshold value for again dividing the image data groups provided by said image data dividing means based on the calculated feature amount;

redividing control means for causing the provided image data groups to be again divided based on the threshold value; and block representative value setting means for setting the block representative value based on the histogram corresponding to each of the image data groups after again divided.

10. The image processing system of claim 9, wherein said redividing control means makes the number of the image data groups after again divided greater than that before again divided.

11. The image processing system of claim 9 further comprising:

means for relating the image data to the block representative values; and means for coding the image data based on the related block representative values.

12. An image processing system for assigning any one of block representative values to approximate image data to the image data corresponding to each of pixels making up an input image and then coding the image data in units of block images made up of the pixels, said image processing system comprising:

histogram preparation means for preparing a histogram of image data input for each of the block images based on a predetermined condition;

image data dividing means for dividing the image data into M image data groups (where M is an integer of two or more) based on the prepared histogram;

comparison means for comparing the number of image data groups M with the preset number of block representative values N (where N is a natural number);

first representative value setting means for setting M block representative values, if the number of image data groups M is equal to or less than the number of block representative values N based on the comparison result of said comparison means;

second representative value setting means for setting N block representative values, if the number of image data groups M exceeds the number of block representative values N based on the comparison result of said comparison means; and feature amount calculation means for calculating a feature amount concerning a distribution state of the histogram corresponding to each of the image data groups.

13. The image processing system of claim 12 further comprising:

means for relating the image data to the block representative values; and means for coding the image data based on the related block representative values.

14. An image processing system for assigning any one of block representative values to approximate image data to the image data corresponding to each of pixels making up an input image and then coding the image data in units of block images made up of the pixels, said image processing system comprising:

histogram preparation means for preparing a histogram of image data input for each of the block images based on a predetermined condition;

image data dividing means for dividing the image data into image data groups based on the prepared histogram;

redividing control means for causing said image data dividing means to again divide the image data if the number of image data groups differs from the number of block representative values preset;

feature amount calculation means for calculating a feature amount concerning a distribution state of the histogram corresponding to each of the image data groups;

determination means for determining whether or not the block representative value is to be calculated using the histogram corresponding to the image data groups based on the calculated feature amount; and block representative value calculation means for calculating the block representative value in response to the determination result of said determination means.

15. The image processing system of claim 14, wherein if the number of image data groups is less than the preset number of block representative values N, said redividing control means selects the image data group to be again divided based on the distribution range of each image data group.

16. The image processing system of claim 15, wherein the feature amount of the image data group in the proximity of the distribution range end is calculated.

17. The image processing system of claim 14, wherein if the number of image data groups is equal to or greater than the preset number of block representative values N, said redividing control means selects based on a distance between image data groups corresponding to a difference between the maximum value of image data making up one image data group and the minimum value of image data making up a different image data group, the one image data group and the different image data group to be combined.

18. The image processing system of claim 14, wherein the image data group in the proximity of the distribution range end of the prepared histogram is separated and divided.

19. The image processing system of claim 14 further comprising:

means for relating the image data to the block representative values; and means for coding the image data based on the related block representative values.

20. An image processing method for assigning any one of block representative values to approximate image data to the image data corresponding to each of pixels making up an input image and then coding the image data in units of block images made up of the pixels, said image processing method comprising:

a histogram preparation step of preparing a histogram of image data input for each of the block images based on a predetermined condition;

an image data dividing step of dividing the image data into M image data groups (where M is an integer of two or more) based on the prepared histogram;

a comparison step of comparing the number of image data groups M with a preset number of block representative values N (where N is a natural number);

a first representative value setting step of setting M block representative values if the number of image data groups M is equal to or less than the number of block representative values N based on the comparison result in said comparison step;

a second representative value setting step of setting N block representative values if the number of image data groups M exceeds the number of block representative values N based on the comparison result in said comparison step; and a feature amount calculation step of calculating a feature amount concerning a distribution state of the histogram corresponding to each of the image data groups.

21. The image processing method of claim 20, further comprising the steps of:

relating the image data to the block representative values; and coding the image data based on the related block representative values.

22. An image processing method for assigning any one of block representative values to approximate image data to the image data corresponding to each of pixels making up an input image and then coding the image data in units of block images made up of the pixels, said image processing method comprising:

a histogram preparation step of preparing a histogram of image data input for each of the block images;

an image data dividing step of dividing the image data into image data groups based on the prepared histogram;

a feature amount calculation step of calculating a feature amount concerning a distribution state of the histogram corresponding to each of the image data groups;

a determination step of determining whether or not the block representative value is to be calculated using the histogram corresponding to each of the image data groups provided in said image data dividing step based on the calculated feature amount;

a redividing control step of causing said image data dividing step to again divide the image data if the block representative value is not calculated using the histogram corresponding to each of the image data groups provided in said image data dividing step in response to the determination result in said determination step; and a block representative value calculation step of calculating the block representative value in response to the determination result in said determination step.

23. The image processing method of claim 22, further comprising the steps of:

relating the image data to the block representative values; and coding the image data based on the related block representative values.

24. An image processing method for assigning any one of block representative values to approximate image data to the image data corresponding to each of pixels making up an input image and then coding the image data in units of block images made up of the pixels, said image processing method comprising:

a histogram preparation step of preparing a histogram of image data input for each of the block images based on a predetermined condition;

an image data dividing step of dividing the image data into image data groups based on the prepared histogram;

a redividing control step of causing said image data dividing step to again divide the image data if the number of image data groups differs from the number of block representative values preset;

a feature amount calculation step of calculating a feature amount concerning a distribution state of the histogram corresponding to each of the image data groups;

a determination step of determining whether or not the block representative value is to be calculated using the histogram corresponding to the image data groups based on the calculated feature amount; and a block representative value calculation step of calculating the block representative value in response to the determination result in said determination step.

25. The image processing method of claim 24, wherein if the number of image data groups is less than the preset number of block representative values N, said redividing control step selects the image data group to be again divided based on the distribution range of each image data group.

26. The image processing method of claim 24, wherein if the number of image data groups is equal to or greater than the preset number of block representative values N, said redividing control step selects based on a distance between image data groups corresponding to a difference between the maximum value of image data making up one image data group and the minimum value of image data making up a different image data group, the one image data group and the different image data group to be combined.

27. The image processing method of claim 24, wherein the image data group in the proximity of the distribution range end of the prepared histogram is separated and divided.

28. The image processing method of claim 24, further comprising the steps of:

relating the image data to the block representative values; and coding the image data based on the related block representative values.

* * * * *